US012720464B2

(12) United States Patent
Bao et al.

(10) Patent No.: US 12,720,464 B2
(45) Date of Patent: Aug. 25, 2026

(54) VIRTUAL POSITIONING REFERENCE UNIT FOR POSITIONING

(71) Applicant: QUALCOMM Incorporated, San Diego, CA (US)

(72) Inventors: Jingchao Bao, San Diego, CA (US); Yuxiang Peng, Sunnyvale, CA (US); Weimin Duan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 586 days.

(21) Appl. No.: 18/180,782

(22) Filed: Mar. 8, 2023

(65) Prior Publication Data

US 2024/0306113 A1 Sep. 12, 2024

(51) Int. Cl.
*H04W 64/00* (2009.01)

(52) U.S. Cl.
CPC .................................. *H04W 64/00* (2013.01)

(58) Field of Classification Search
CPC ................................................... H04W 64/00
USPC ........ 455/452.1, ,438, 453, 450, 435.1, 461, 455/456.2, 458, 522, 437
See application file for complete search history.

(56) References Cited

U.S. PATENT DOCUMENTS

2011/0075860 A1* 3/2011 Nakagawa ............ G01S 3/8006 381/94.1
2011/0143802 A1* 6/2011 Shin ...................... H04W 68/04 455/515
2015/0312783 A1* 10/2015 Wakabayashi ........ H04W 76/27 370/241.1
2015/0334730 A1* 11/2015 Wakabayashi ........ H04W 24/10 370/329
2016/0266232 A1* 9/2016 Chen ................... G01S 5/02526
2021/0327146 A1* 10/2021 Buerli ..................... G06T 19/20
2022/0083197 A1* 3/2022 Rockel .................. G06T 19/006
2023/0040610 A1* 2/2023 Buerli ................. G06F 3/04815
2023/0048739 A1 2/2023 Bengtsson et al.

(Continued)

FOREIGN PATENT DOCUMENTS

EP 2558879 B1 8/2021

OTHER PUBLICATIONS

International Search Report and Written Opinion—PCT/US2024/010359—ISA/EPO—May 14, 2024.

(Continued)

*Primary Examiner* — Joseph Arevalo
(74) *Attorney, Agent, or Firm* — Procopio, Cory, Hargreaves & Savitch LLP

(57) ABSTRACT

Aspects presented herein may enable a network entity (e.g., a location server, an LMF, etc.) to generate and configure virtual anchors and/or virtual positioning reference units (VPRUs) for a UE for UE-based positioning. In one aspect, a network entity receives an indication to perform UE-based positioning for a UE. The network entity configures, for the UE, assistance data that includes a list of virtual anchors and a list of VPRUs for the UE-based positioning. The network entity transmits the assistance data including the list of virtual anchors and the list of VPRUs. The network entity may generate the list of virtual anchors based on a location offset to each physical anchor in a set of physical anchors. The network entity may generate the list of VPRUs based on at least one physical PRU.

24 Claims, 21 Drawing Sheets

(56) References Cited

U.S. PATENT DOCUMENTS

2023/0298286 A1* 9/2023 Okamoto .............. G06F 3/1423
345/633

OTHER PUBLICATIONS

Lenovo: "DL & UL Carrier Phase Positioning Discussion", 3GPP Tsg ran WG1#112, R1-2301214, Type Discussion, NR POS_ENH2-CORE, 3rd Generation Partnership Project, Mobile Competence Centre, 650, Route Des Lucioles, F-06921 Sophia-Antipolis Cedex, France, vol. 3GPP RAN 1, No. Athens, GR, Feb. 27, 2023-Mar. 3, 2023, Feb. 17, 2023, 9 pages, XP052248352, Section "An example of CRU/DRU allocation".

Qi X., et al., "Evaluation on Interference Averaging of 16m DL/UL Inner Permutation", IEEE Draft, C80216M-09_0260R2, IEEE-SA, IEEE 802.16 presentation Submission Template (Rev.9), Piscataway, NJ USA, vol. 802.16m, Jan. 13, 2009, 22 Pages, XP017634739, Section 3.3.

Sony: "On Supporting UE-based Positioning", 3GPP TSG-RAN WG2 Meeting #109 electronic, R2-2000837, 3rd Generation Partnership Project, Mobile Competence Centre, 650, Route Des Lucioles, F-06921 Sophia-Antipolis Cedex, France, vol. RAN WG2, No. Elbonia, Feb. 24, 2020-Mar. 6, 2020, Feb. 13, 2020, 3 Pages, XP051848628, Section Discussion.

Vollath U., et al., "Multi-Base RTK Positioning Using Virtual Reference Stations", GPS 2000—Proceedings of the 13th International Technical Meeting of the Satellite Division of the Institute of Navigation (ION GPS 2000), The Institute of Navigation, 8551 Rixlew Lane Suite 360 Manassas, VA 20109, USA, Sep. 22, 2000, pp. 123-131, XP056002360, Sections "Level 2: Modelling the Errors", "Level 3: Virtual Reference Station", "Reference Data Displacement", "Error Interpolation", "Typical Field Set-up Procedure".

* cited by examiner

1400
UE 1402
Network Entity 1404
1420
Indication to perform UE-based positioning
1432
Indication of a preferred VPRU
1422
Configure assistance data 1406 for the UE 1402 – the assistance data 1406 includes a list of virtual anchors 1408 and a list of VPRUs 1410 for the UE-based positioning
1428
Generate the list of virtual anchors 1408 based on applying a location/vector offset to each physical anchor in a set of physical anchors
1430
Generate the list of VPRUs 1410 based on at least one physical PRU - each VPRU is associated with a corresponding virtual location
1434
Indication of using a VPRU 1412 for the UE-based positioning
1436
Generate a set of measurements or correction data for the VPRU 1412 based on the virtual location of the VPRU 1412 and the virtual locations of one or more virtual anchors
1424
Assistance data 1406
1438
Set of measurements or correction data for the VPRU 1412
1426
Perform the UE-based positioning using at least one virtual anchor and/or at least one VPRU

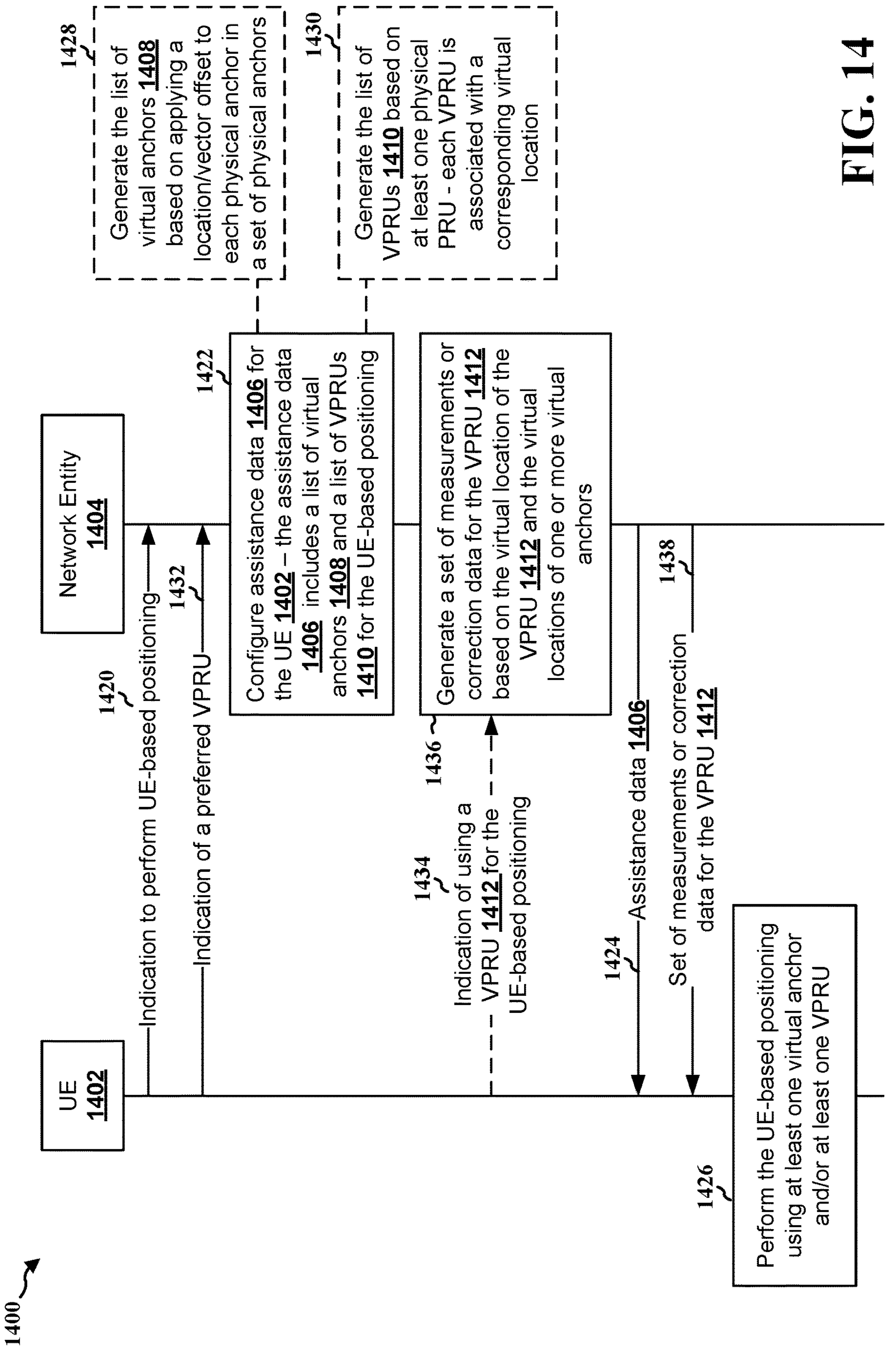

FIG. 14

VIRTUAL POSITIONING REFERENCE UNIT FOR POSITIONING

TECHNICAL FIELD

The present disclosure relates generally to communication systems, and more particularly, to a wireless communication involving virtual positioning reference unit(s).

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus receives an indication to perform user equipment (UE)-based positioning for a UE. The apparatus configures, for the UE, assistance data that includes a list of virtual anchors and a list of virtual positioning reference units (VPRUs) for the UE-based positioning. The apparatus transmits the assistance data including the list of virtual anchors and the list of VPRUs.

In an aspect of the disclosure, a method, a computer-readable medium, and an apparatus are provided. The apparatus transmits, to a network entity, an indication to perform UE-based positioning. The apparatus receives, from the network entity, assistance data that includes a list of virtual anchors and a list of VPRUs for the UE-based positioning. The apparatus performs the UE-based positioning using at least one virtual anchor and at least one VPRU in the assistance data.

To the accomplishment of the foregoing and related ends, the one or more aspects may include the features hereinafter fully described and particularly pointed out in the claims. The following description and the drawings set forth in detail certain illustrative features of the one or more aspects. These features are indicative, however, of but a few of the various ways in which the principles of various aspects may be employed.

BRIEF DESCRIPTION OF THE DRAWINGS

FIG. 14 is a communication flow illustrating an example of a network entity configuring virtual anchors and VPRUs for a UE in accordance with various aspects of the present disclosure.

DETAILED DESCRIPTION

Figure 1:
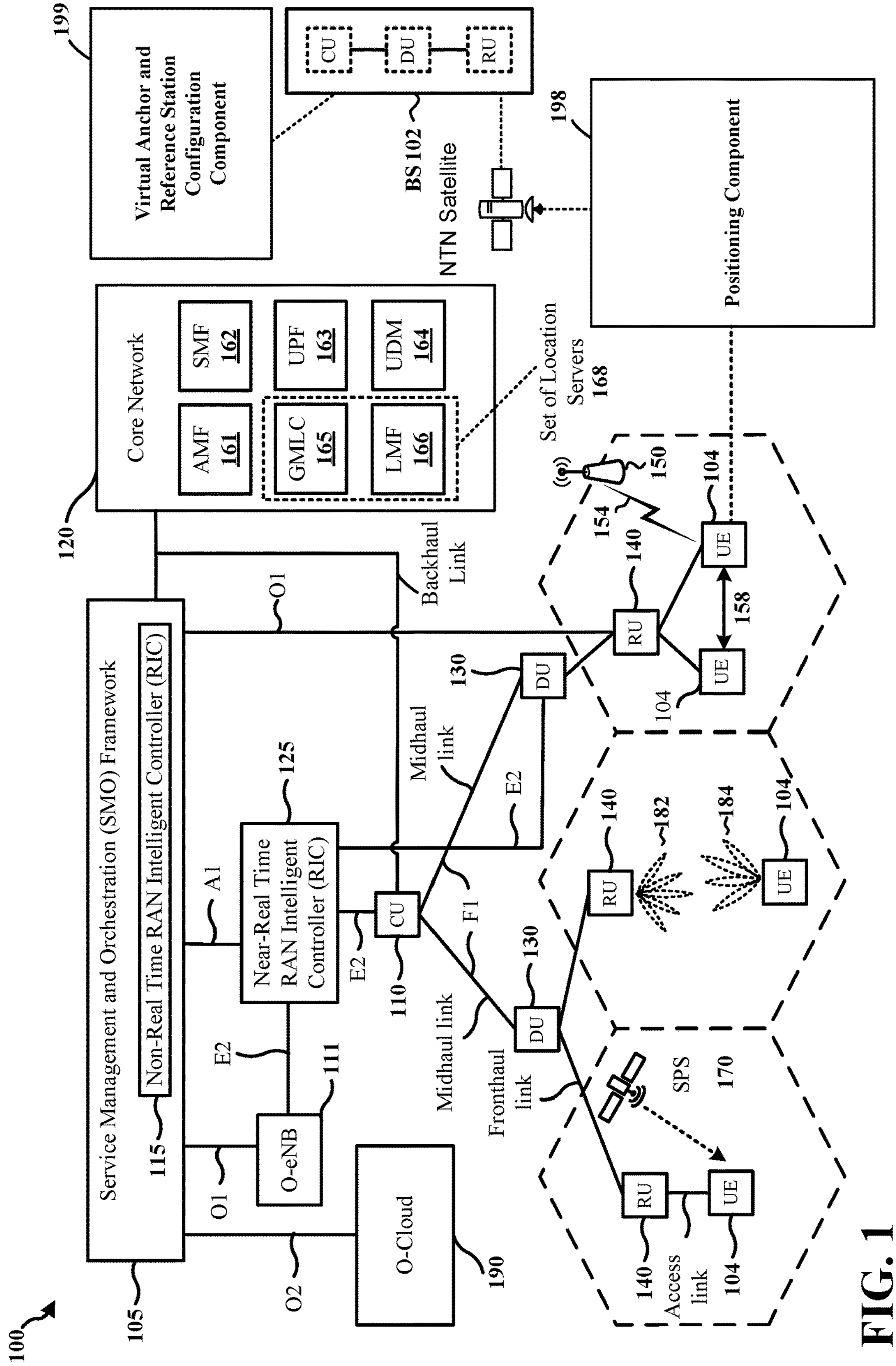
FIG. 1 is a diagram illustrating an example of a wireless communications system and an access network.

Aspects presented herein may enable a UE to achieve a high accuracy positioning without knowing the locations of certain network nodes, such as the positioning reference unit (PRU) and the transmission reception points (TRPs). Aspects presented herein may enable a UE to perform positioning (e.g., UE-based positioning) using a virtual PRU (VPRU) and/or virtual anchors, such that the PRU/anchors may provide measurements, reference signals, assistance data, and/or correction data to the UE without disclosing their actual locations. In one aspect of the present disclosure, a VPRU may indicate that there is no physical PRU (PPRU) located at the claimed location of the VPRU, where measurements, assistance data, and/or correction data may be virtually generated for a UE based on the VPRU and or PPRU information/measurements. Thus, a network may generate a VPRU or a virtual reference station for a UE at any location. The measurements, assistance data, and/or correction data from a VPRU may be based on one or multiple physical PRUs' measurements, and/or based on the network resolving/tracking various error source values.

By enabling a UE to perform positioning using virtual anchors (e.g., TRPs/satellites), a carrier operator (e.g., the operator for a location server, a location management function (LMF), a non-terrestrial network (NTN), etc.) may avoid releasing/providing accurate or true locations of their network nodes such as anchor base stations and/or anchor satellites, etc., thereby maintaining the privacy and security for these network nodes. In addition, for moving anchors such as a mobile UE associated with sidelink positioning or a low earth orbit (LEO) satellite associated with an NTN, the locations of these moving anchors may be difficult to estimate and share with a UE in real-time. Thus, using virtual anchors may be more suitable and convenient for the UE to perform the positioning. Aspects presented herein may enable ground truth locations of anchors to be protected with noise. Similarly, by enabling a UE to perform positioning using a VPRU, a carrier operator or a PRU may also avoid releasing/providing the accurate or the true ground location of the PRU, thereby maintaining the privacy and security for the PRU. The location of a VPRU may be pre-assigned (e.g., which may be more suitable for an NTN) or generated based on the location of a target UE (e.g., the generated VPRU is in proximity to the target UE). Aspects presented herein may enable a UE to achieve a high-accuracy positioning by enabling the UE to cancel the common anchor location errors (e.g., using correction data from a PRU). Also, while physical PRUs may not be able to receive measurements and/or signals from the same set of anchors as a UE, using a VPRU may enable measurements from the VPRU are associated with one or more common anchors of the UE. In other words, using a virtual PRU may guarantee the measurements are from common anchors.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can include a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmission reception point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUS 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via 01) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base station 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base station 102/UEs 104 may use spectrum up to Y MHZ (e.g., 5, 10, 15, 20, 100, 400, etc. MHz) bandwidth per carrier allocated in a carrier aggregation of up to a total of Yx MHZ (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth®, Wi-Fi® based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHZ-7.125 GHZ) and FR2 (24.25 GHz-52.6 GHZ). Although a portion of FR1 is greater than 6 GHZ, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHZ-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHZ-71 GHZ), FR4 (71 GHZ-114.25 GHZ), and FR5 (114.25 GHZ-300 GHz). Each of these higher frequency bands falls within the EHF band.

With the above aspects in mind, unless specifically stated otherwise, the term "sub-6 GHz" or the like if used herein may broadly represent frequencies that may be less than 6 GHZ, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a TRP, network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the base station 102 serving the UE 104. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/ actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may include a positioning component 198 that may be configured to transmit, to a network entity, an indication to perform UE-based positioning; receive, from the network entity, assistance data that includes a list of virtual anchors and a list of VPRUs for the UE-based positioning; and perform the UE-based positioning using at least one virtual anchor and at least one VPRU in the assistance data.

In certain aspects, the base station 102 may have a virtual anchor and reference station configuration component 199 that may be configured to receive an indication to perform UE-based positioning for a UE; configure, for the UE, assistance data that includes a list of virtual anchors and a list of virtual positioning reference units (VPRUs) for the UE-based positioning; and transmit, to the UE, the assistance data including the list of virtual anchors and the list of VPRUs.

Figures 2A, 2B, 2C, 2D:
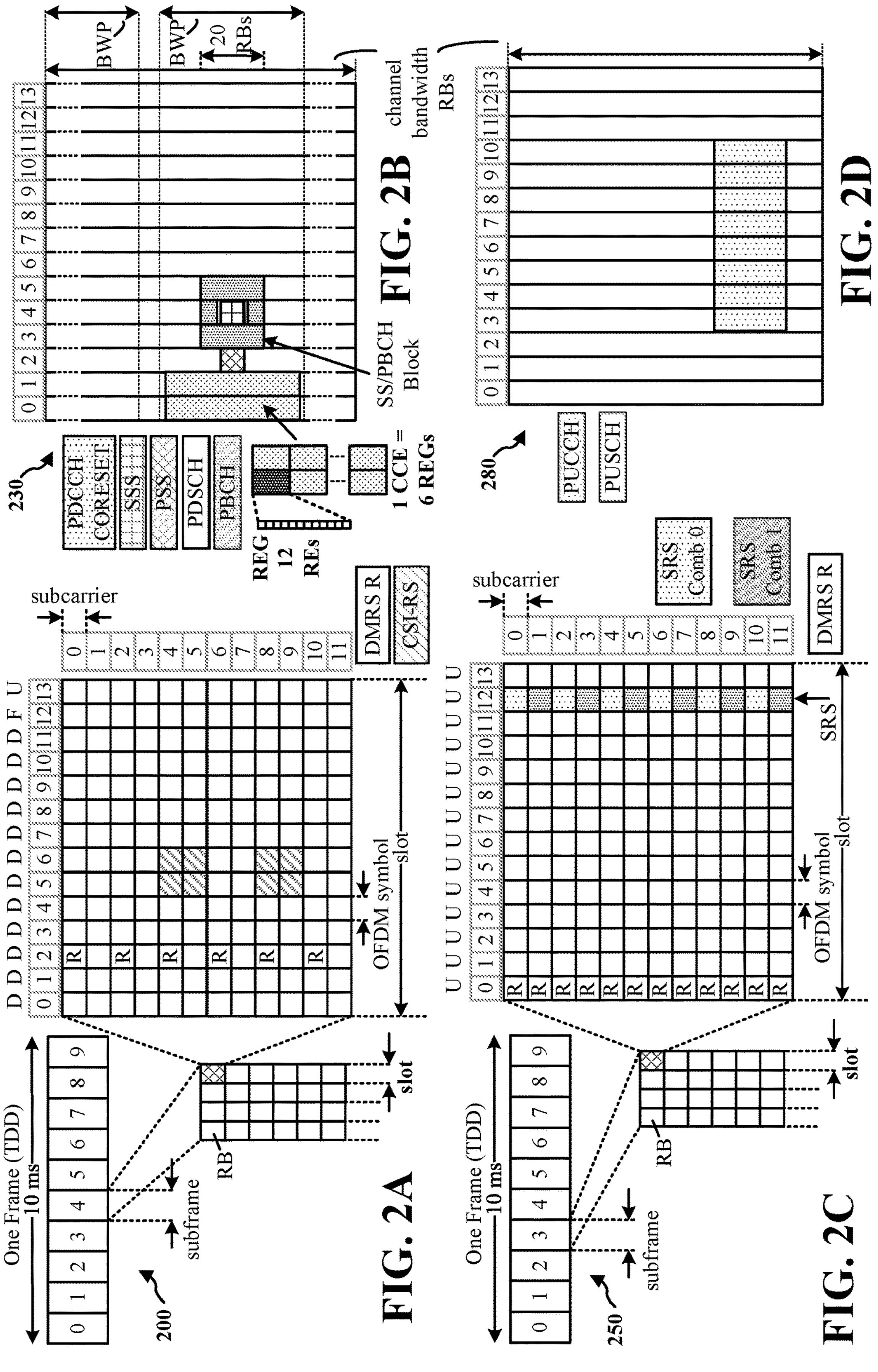
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (for power limited scenarios; limited to a single stream transmission). The number of slots within a subframe is based on the CP and the numerology. The numerology defines the subcarrier spacing (SCS) (see Table 1). The symbol length/duration may scale with 1/SCS.

TABLE 1

Numerology, SCS, and CP

| $\mu$ | SCS $\Delta f = 2^{\mu} \cdot 15$[kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |
| 5 | 480 | Normal |
| 6 | 960 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^{\mu}$ slots/subframe. The subcarrier spacing may be equal to $2^{\mu}$ *15 kHz, where u is the numerology 0 to 4. As such, the numerology $\mu$=0 has a subcarrier spacing of 15 kHz and the numerology $\mu$=4 has a subcarrier spacing of 240 kHz. The symbol length/duration is inversely related to the subcarrier spacing. FIGS. 2A-2D provide an example of normal CP with 14 symbols per slot and numerology=2 with 4 slots per subframe. The slot duration is 0.25 ms, the subcarrier spacing is 60 kHz, and the symbol duration is approximately 16.67 $\mu$s. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
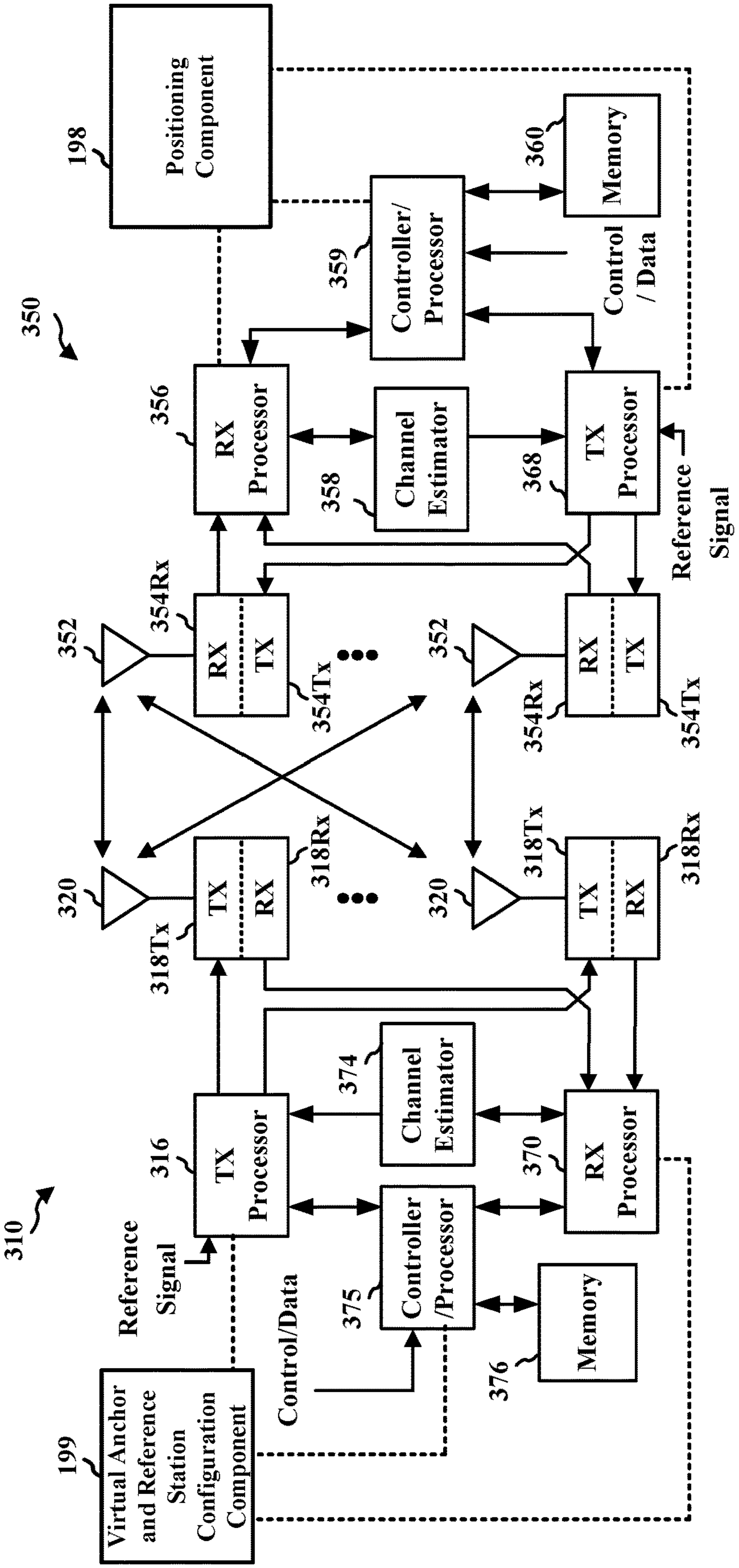
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency-domain, and then combined together using an Inverse Fast Fourier Transform (IFFT) to produce a physical channel carrying a time-domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency-domain using a Fast Fourier Transform (FFT). The frequency-domain signal includes a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the positioning component 198 of FIG. 1.

At least one of the TX processor 316, the RX processor 370, and the controller/processor 375 may be configured to perform aspects in connection with the virtual anchor and reference station configuration component 199 of FIG. 1.

Figure 4:
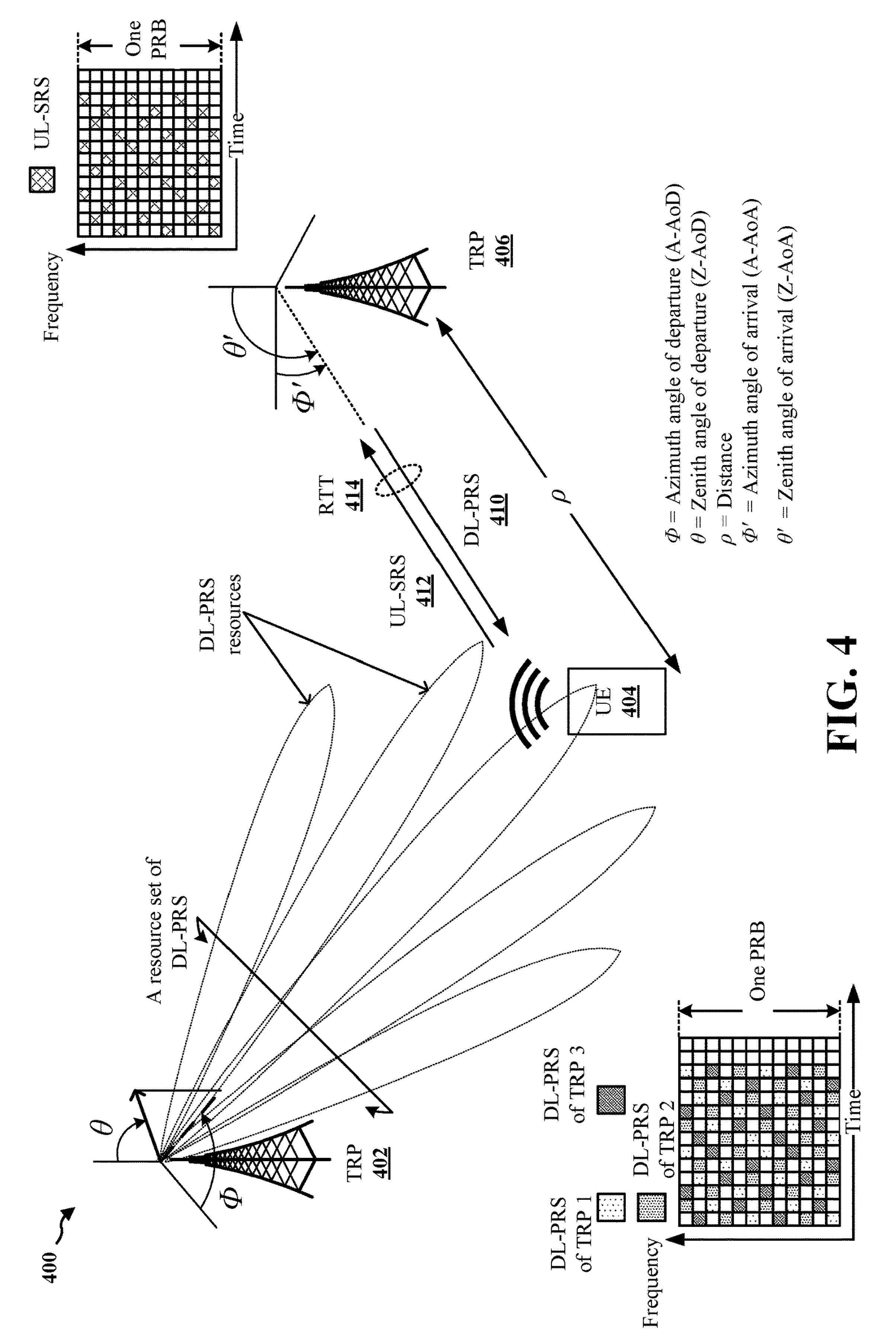
FIG. 4 is a diagram illustrating an example of a UE positioning based on reference signal measurements.

FIG. 4 is a diagram 400 illustrating an example of a UE positioning based on reference signal measurements (which may also be referred to as "network-based positioning") in accordance with various aspects of the present disclosure. The UE 404 may transmit UL-SRS 412 at time $T_{SRS\_TX}$ and receive DL positioning reference signals (PRS) (DL-PRS) 410 at time $T_{PRS\_RX}$. The TRP 406 may receive the UL-SRS 412 at time $T_{SRS\_RX}$ and transmit the DL-PRS 410 at time $T_{PRS\_TX}$. The UE 404 may receive the DL-PRS 410 before transmitting the UL-SRS 412, or may transmit the UL-SRS 412 before receiving the DL-PRS 410. In both cases, a positioning server (e.g., location server(s) 168) or the UE 404 may determine the RTT 414 based on $||T_{SRS\_RX}-T_{PRS\_TX}|-|T_{SRS\_TX}-T_{PRS\_RX}||$. Accordingly, multi-RTT positioning may make use of the UE Rx-Tx time difference measurements (i.e., $|T_{SRS\_TX}-T_{PRS\_RX}|$) and DL-PRS reference signal received power (RSRP) (DL-PRS-RSRP) of downlink signals received from multiple TRPs 402, 406 and measured by the UE 404, and the measured TRP Rx-Tx time difference measurements (i.e., $|T_{SRS\_RX}-T_{PRS\_TX}|$) and UL-SRS-RSRP at multiple TRPs 402, 406 of uplink signals transmitted from UE 404. The UE 404 measures the UE Rx-Tx time difference measurements (and optionally DL-PRS-RSRP of the received signals) using assistance data received from the positioning server, and the TRPs 402, 406 measure the gNB Rx-Tx time difference measurements (and optionally UL-SRS-RSRP of the received signals) using assistance data received from the positioning server. The measurements may be used at the positioning server or the UE 404 to determine the RTT, which is used to estimate the location of the UE 404. Other methods are possible for determining the RTT, such as for example using DL-TDOA and/or UL-TDOA measurements.

PRSs may be defined for network-based positioning (e.g., NR positioning) to enable UEs to detect and measure more neighbor transmission and reception points (TRPs), where multiple configurations are supported to enable a variety of deployments (e.g., indoor, outdoor, sub-6, mmW, etc.). To support PRS beam operation, beam sweeping may also be configured for PRS. The UL positioning reference signal may be based on sounding reference signals (SRSs) with enhancements/adjustments for positioning purposes. In some examples, UL-PRS may be referred to as "SRS for positioning," and a new Information Element (IE) may be configured for SRS for positioning in RRC signaling.

DL PRS-RSRP may be defined as the linear average over the power contributions (in [W]) of the resource elements of the antenna port(s) that carry DL PRS reference signals configured for RSRP measurements within the considered measurement frequency bandwidth. In some examples, for FR1, the reference point for the DL PRS-RSRP may be the antenna connector of the UE. For FR2, DL PRS-RSRP may be measured based on the combined signal from antenna elements corresponding to a given receiver branch. For FR1 and FR2, if receiver diversity is in use by the UE, the reported DL PRS-RSRP value may not be lower than the corresponding DL PRS-RSRP of any of the individual receiver branches. Similarly, UL SRS-RSRP may be defined as linear average of the power contributions (in [W]) of the resource elements carrying sounding reference signals (SRS). UL SRS-RSRP may be measured over the configured resource elements within the considered measurement frequency bandwidth in the configured measurement time occasions. In some examples, for FR1, the reference point for the UL SRS-RSRP may be the antenna connector of the base station (e.g., gNB). For FR2, UL SRS-RSRP may be measured based on the combined signal from antenna elements corresponding to a given receiver branch. For FR1 and FR2, if receiver diversity is in use by the base station, the reported UL SRS-RSRP value may not be lower than the corresponding UL SRS-RSRP of any of the individual receiver branches.

PRS-path RSRP (PRS-RSRPP) may be defined as the power of the linear average of the channel response at the i-th path delay of the resource elements that carry DL PRS signal configured for the measurement, where DL PRS-RSRPP for the 1st path delay is the power contribution corresponding to the first detected path in time. In some examples, PRS path Phase measurement may refer to the phase associated with an i-th path of the channel derived using a PRS resource.

DL-AoD positioning may make use of the measured DL-PRS-RSRP of downlink signals received from multiple TRPs 402, 406 at the UE 404. The UE 404 measures the DL-PRS-RSRP of the received signals using assistance data received from the positioning server, and the resulting measurements are used along with the azimuth angle of departure (A-AoD), the zenith angle of departure (Z-AoD), and other configuration information to locate the UE 404 in relation to the neighboring TRPs 402,406.

DL-TDOA positioning may make use of the DL reference signal time difference (RSTD) (and optionally DL-PRS-RSRP) of downlink signals received from multiple TRPs 402, 406 at the UE 404. The UE 404 measures the DL RSTD (and optionally DL-PRS-RSRP) of the received signals using assistance data received from the positioning server, and the resulting measurements are used along with other configuration information to locate the UE 404 in relation to the neighboring TRPs 402, 406.

UL-TDOA positioning may make use of the UL relative time of arrival (RTOA) (and optionally UL-SRS-RSRP) at multiple TRPs 402, 406 of uplink signals transmitted from UE 404. The TRPs 402, 406 measure the UL-RTOA (and optionally UL-SRS-RSRP) of the received signals using assistance data received from the positioning server, and the resulting measurements are used along with other configuration information to estimate the location of the UE 404.

UL-AoA positioning may make use of the measured azimuth angle of arrival (A-AoA) and zenith angle of arrival (Z-AoA) at multiple TRPs 402, 406 of uplink signals transmitted from the UE 404. The TRPs 402, 406 measure the A-AoA and the Z-AoA of the received signals using assistance data received from the positioning server, and the resulting measurements are used along with other configuration information to estimate the location of the UE 404. For purposes of the present disclosure, a positioning operation in which measurements are provided by a UE to a base station/positioning entity/server to be used in the computation of the UE's position may be described as "UE-assisted," "UE-assisted positioning," and/or "UE-assisted position calculation," while a positioning operation in which a UE measures and computes its own position may be described as "UE-based," "UE-based positioning," and/or "UE-based position calculation."

Additional positioning methods may be used for estimating the location of the UE 404, such as for example, UE-side UL-AoD and/or DL-AoA. Note that data/measurements from various technologies may be combined in various ways to increase accuracy, to determine and/or to enhance certainty, to supplement/complement measurements, and/or to substitute/provide for missing information. For example, some UE positioning mechanisms may be radio access technology (RAT)-dependent (e.g., the positioning of a UE is based on a RAT), such as the downlink positioning (e.g., measuring of observed time difference of arrival (OTDOA), the uplink positioning (e.g., measuring of uplink time difference of arrival (UTDOA), and/or the combined DL and UL based positioning (e.g., measuring of RTT with respect to neighboring cells), etc. Some wireless communications systems may also support Enhanced Cell-ID (E-CID) positioning procedures that are based on radio resource management (RRM) measurements. On the other hand, some UE positioning mechanisms may be RAT-independent (e.g., the positioning of a UE does not rely on a RAT), such as the enhanced GNSS, and/or positioning technologies based on WLAN, Bluetooth, Terrestrial Beason System (TBS), and/or sensor based (e.g., barometric sensor, motion sensor), etc. Some UE positioning mechanisms may be based on a hybrid model, where multiple methods for positioning are used, which may include both RAT-dependent positioning technology and RAT-independent positioning technology (e.g., a GNSS with OTDOA hybrid positioning).

Note that the terms "positioning reference signal" and "PRS" generally refer to specific reference signals that are used for positioning in NR and LTE systems. However, as used herein, the terms "positioning reference signal" and "PRS" may also refer to any type of reference signal that can be used for positioning, such as but not limited to, PRS as defined in LTE and NR, TRS, PTRS, CRS, CSI-RS, DMRS, PSS, SSS, SSB, SRS, UL-PRS, etc. In addition, the terms "positioning reference signal" and "PRS" may refer to downlink or uplink positioning reference signals, unless otherwise indicated by the context. To further distinguish the type of PRS, a downlink positioning reference signal may be referred to as a "DL PRS," and an uplink positioning reference signal (e.g., an SRS-for-positioning, PTRS) may be referred to as an "UL-PRS." In addition, for signals that may be transmitted in both the uplink and downlink (e.g., DMRS. PTRS), the signals may be prepended with "UL" or "DL" to distinguish the direction. For example, "UL-DMRS" may be differentiated from "DL-DMRS."

A device (e.g., a UE) equipped with a global navigation satellite system (GNSS) receiver (which may include the Global Positioning System (GPS) receiver) may determine its location based on GNSS positioning. GNSS is a network of satellites broadcasting timing and orbital information used for navigation and positioning measurements. GNSS may include multiple groups of satellites, known as constellations, that broadcast signals (which may be referred to as GNSS signals) to control stations and users of the GNSS. Based on the broadcast signals, the users may be able to determine their locations (e.g., via trilateration process). For purposes of the present disclosure, a device (e.g., a UE) that is equipped with a GNSS receiver or is capable of receiving GNSS signals may be referred to as a GNSS device, and a device that is capable of transmitting GNSS signals, such as a satellite, may be referred to as a space vehicle (SV).

Figure 5:
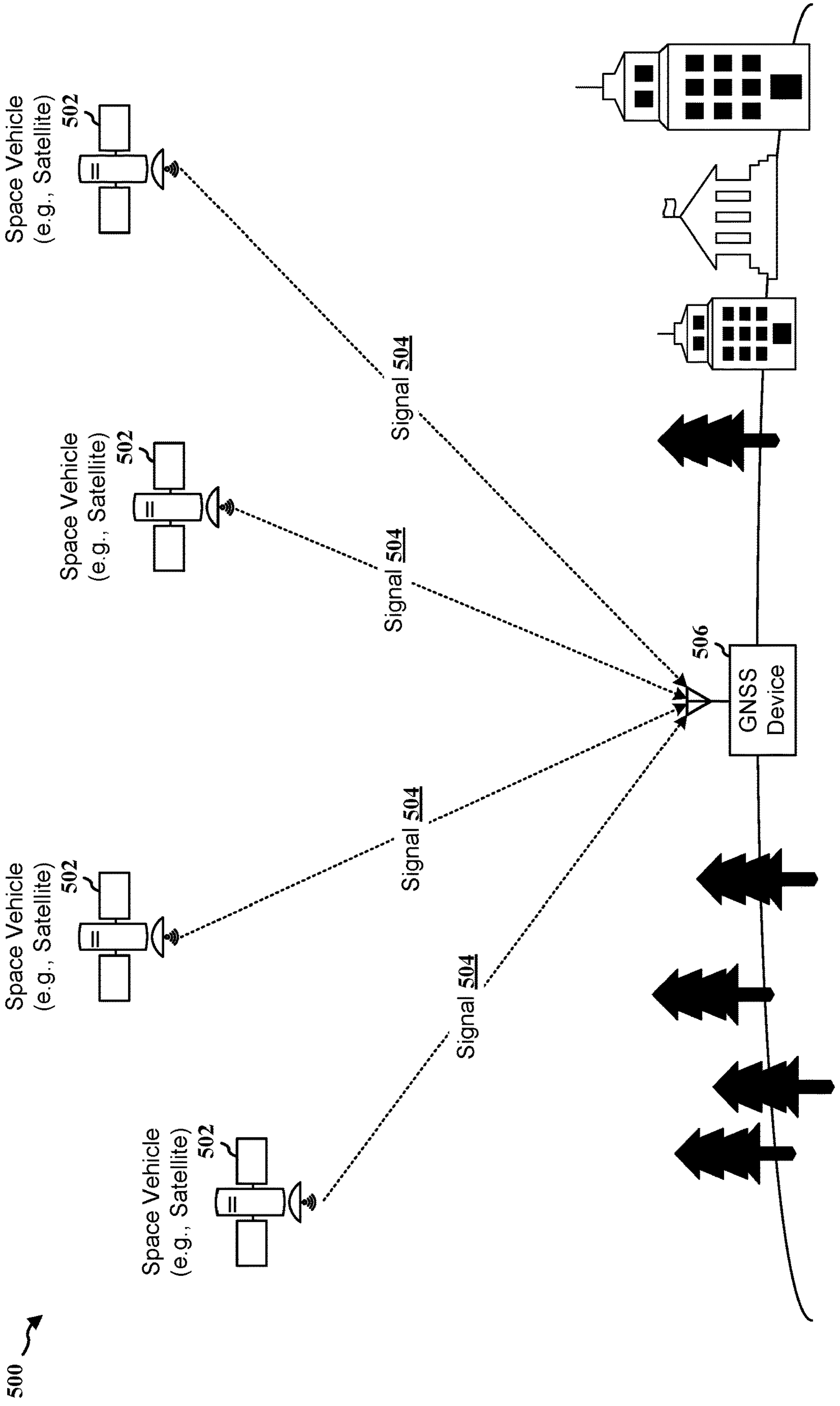
FIG. 5 is a diagram illustrating an example of global navigation satellite system (GNSS) positioning in accordance with various aspects of the present disclosure.

FIG. 5 is a diagram 500 illustrating an example of GNSS positioning in accordance with various aspects of the present disclosure. A GNSS device 506 may calculate its position and time based at least in part on data (e.g., GNSS signals 504) received from multiple space vehicles (SVs) 502, where each SV 502 may carry a record of its position and time and may transmit that data (e.g., the record) to the GNSS device 506. Each SV 502 may further include a clock that is synchronized with other clocks of SVs and with ground clock(s). If an SV 502 detects that there is a drift from the time maintained on the ground, the SV 502 may correct it. The GNSS device 506 may also include a clock, but the clock for the GNSS device 506 may be less stable and precise compared to the clocks for each SV 502.

As the speed of radio waves may be constant and independent of the satellite speed, a time delay between a time the SV 502 transmits a GNSS signal 504 and a time the GNSS device 506 receives the GNSS signal 504 may be proportional to the distance from the SV 502 to the GNSS device 506. In some examples, a minimum of four SVs may be used by the GNSS device 506 to compute/calculate one or more unknown quantities associated with positioning (e.g., three position coordinates and clock deviation from satellite time, etc.).

Each SV 502 may broadcast the GNSS signal 504 (e.g., a carrier wave with modulation) continuously that may include a pseudorandom code (e.g., a sequence of ones and zeros) which may be known to the GNSS device 506, and may also include a message that includes a time of transmission and the SV position at that time. In other words, each GNSS signal 504 may carry two types of information: time and carrier wave (e.g., a modulated waveform with an input signal to be electromagnetically transmitted). Based on the GNSS signals 504 received from each SV 502, the GNSS device 506 may measure the time of arrivals (ToAs) of the GNSS signals 504 and calculate the time of flights (ToFs) for the GNSS signals 504. Then, based on the ToFs, the GNSS device 506 may compute its three-dimensional position and clock deviation, and the GNSS device 506 may determine its position on the Earth. For example, the GNSS device 506's location may be converted to a latitude, a longitude, and a height relative to an ellipsoidal Earth model. These coordinates may be displayed, such as on a moving map display, or recorded or used by some other system, such as a vehicle guidance system.

While the distance between a GNSS device and an SV may be calculated based on the time it takes for a GNSS signal to reach the GNSS device, the SV's signal sequence may be delayed in relation to the GNSS device's sequence. Thus, in some examples, a delay may be applied to the GNSS device's sequence, such that the two sequences are aligned. For example, to calculate the delay, a GNSS device may align a pseudorandom binary sequence contained in the SV's signal to an internally generated pseudorandom binary sequence. As the SV's GNSS signal takes time to reach the GNSS device, the SV's sequence may be delayed in relation to the GNSS device's sequence. By increasingly delaying the GNSS device's sequence, the two sequences may eventually be aligned.

The accuracy of GNSS based positioning may depend on various factors, such as satellite geometry, signal blockage, atmospheric conditions, and/or receiver design features/quality, etc. For example, GNSS receivers used by smartphones or smart watches may have lower accuracy compared to GNSS receivers used by vehicles and surveying equipments. To improve the accuracy of GNSS positioning (e.g., from meters to centimeters), a real time kinematics (RTK) technique or mechanism (which may collectively be referred to as an RTK engine hereafter) may be used for a positioning device (e.g., a UE, a surveying equipment, an automobile GNSS system, etc.). For example, an RTK engine may enable a positioning device to use correction information from a base station to mitigate one or more error sources in GNSS receiver pseudo-range (PR) and carrier-phase (CP) measurements, which may include satellite orbit error, satellite clock error, and/or atmospheric error, etc. Thus, better accuracy may be achieved by the positioning device.

Figure 6:
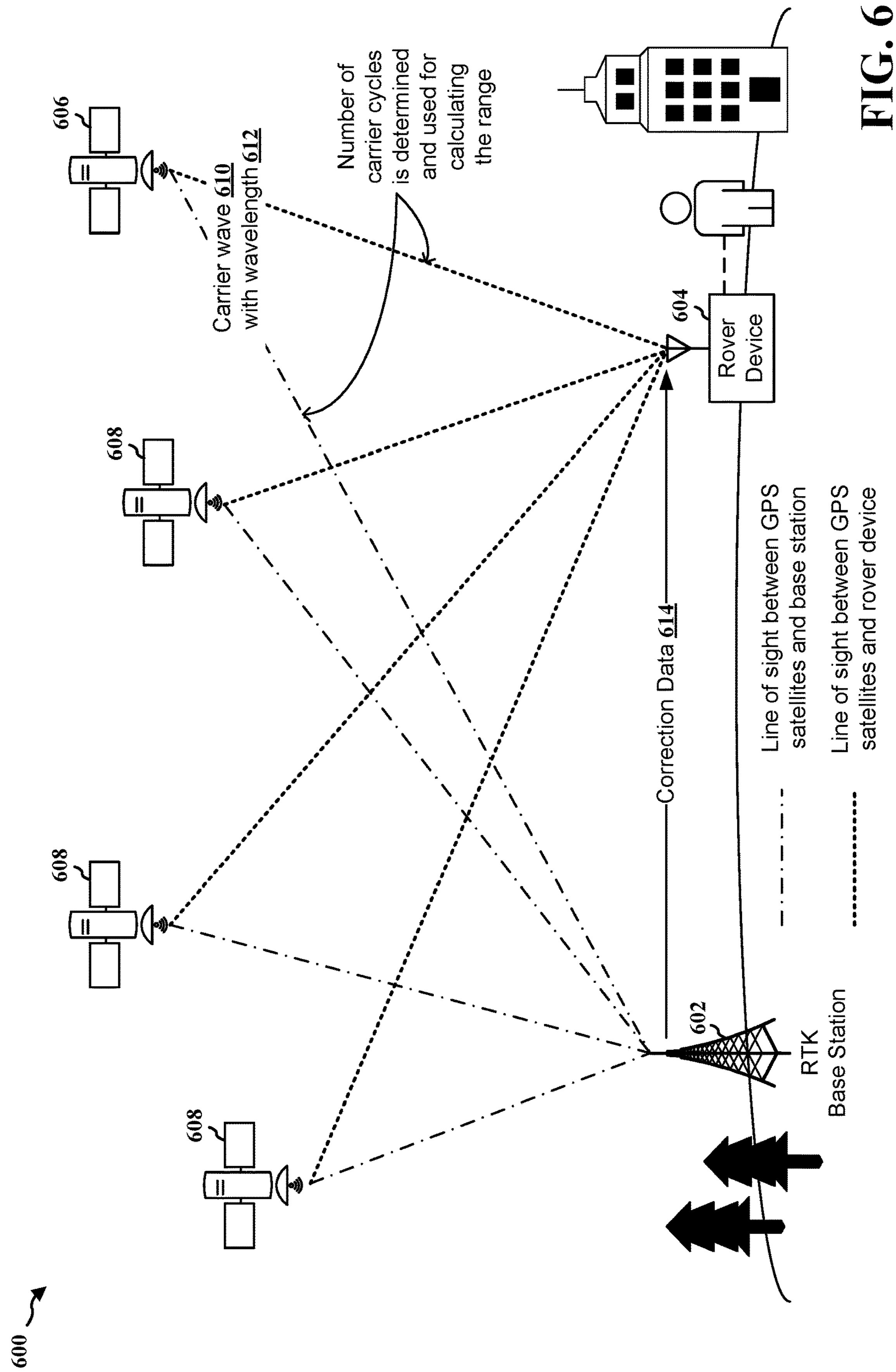
FIG. 6 is a diagram illustrating an example of a real time kinematics (RTK) positioning in accordance with various aspects of the present disclosure.

FIG. 6 is a diagram 600 illustrating an example of an RTK positioning in accordance with various aspects of the present disclosure. In one example, at least two receivers may be used in association with the RTK positioning, where at least one of the receivers may be stationary, which may be referred to as a base station 602 or an RTK base station, and at least one other receiver may be mobile (e.g., may be moving from time to time), which may be referred to as a rover or a rover device 604 (e.g., a GNSS/GPS receiver, a UE, a rover station, etc.). In other words, an RTK system may include at least a base station and a rover, where the base station may be a stationary receiver whose location is known.

A range between an SV 606 (e.g., a GNSS/GPS satellite) and the rover device 604 or between the SV 606 and the base station 602 may be calculated by determining a number of carrier cycles between the SV 606 and the rover device 604 or the base station 602, and multiplying this number by the carrier wavelength 612 of a carrier wave 610 (e.g., a carrier signal) transmitted by the SV 606. For example, if the SV 606 is transmitting a carrier wave 610 with a wavelength 612 of ten (10) meters, and the rover device 604 receives the carrier wave 610 and determines that there are five hundred (500) carrier cycles between the SV 606 and the rover device 604, then the rover device 604 may calculate the distance between the SV 606 and the rover device 604 by multiplying the number of carriers cycles determined (e.g., 500) with the carrier wavelength 612 (e.g., 10 meters), which may be five thousand meters (e.g., 500×10=5000). Similarly, the base station 602 may also receive the carrier wave 610 from the SV 606 and determine its ranges from the SV 606 based on the wavelength 612 of the carrier wave 610 and the number of carrier cycles between the base station 602 and the SV 606. The rover device 604 and/or the base station 602 may calculate ranges (e.g., distances) between the rover device 604/base station 602 and multiple (e.g., four or more) SVs (e.g., SVs 606 and 608) to determine their geographical locations (e.g., their locations on the Earth).

During the RTK positioning, the rover device 604 (e.g., a UE, a client device, etc.) may undergo an "ambiguity resolution" process to determine the number of carrier cycles between the SV 606 and the rover device 604. In other words, when the rover device 604 receives a carrier wave from an SV 606, it may take time for the rover device 604 to figure out how many carrier cycles are between the SV 606 and the rover device 604. In some examples, a GNSS receiver with more sophisticated or high-end antenna/hardware, such as an automotive grade antenna, may be able to resolve the ambiguity within a relatively short time (e.g., within seconds), while a GNSS receiver with less sophisticated or low-end antenna/hardware, such as antenna for mobile phone, and/or a smart watch, may take a longer time (e.g., 10-30 minutes or more) to resolve the ambiguity. In some examples, the ambiguity may also be referred to as an "integer ambiguity." In some examples, the process of a GNSS receiver resolving the ambiguity may be referring to as converging, and the time it takes a device to resolve the ambiguity may be referred to as a convergence time.

In some scenarios, ranges calculated by the rover device 604 may include errors due to SV clock and ephemerides, and ionospheric and tropospheric delays, etc. Also, as the rover device 604 is more likely to be moving, the quality of a signal/carrier wave received from each SV may change as the rover device moves from one location to another location. For example, if the rover device 604 moves from an open sky area to an area with buildings, signals from one or more SVs 606/608 may be blocked/reflected by the buildings. As such, ranges calculated by the rover device 604 may start to drift and may include error(s).

On the other hand, as the base station 602 is likely to be stationary with a known location, and the base station 602 may be equipped with a more sophisticated and high-end GNSS receiver, the base station 602 may be able to maintain an accurate calculation for the ranges compared to the rover device 604. For example, the base station 602 may be located at a site (e.g., an open sky area) that has minimal environmental effects such as interference and multipath. As such, under the RTK positioning, as the base station 602 may have known its location already (e.g., via pre-surveying), the base station 602 may perform a measurement for an SV to obtain a base receiver measurement (e.g., to estimate a difference between the base station and the SV). Then, the base station 602 may minus the geometry distance between the base station location to SV location from the base receiver measurement to obtain a base correction (e.g., based on a difference or an error). The base station 602 may generate a correction data 614 (or a correction signal) based on the obtained base correction and transmit the correction data 614 to the rover device 604 to assist the rover device 604 in correcting the errors. For example, as the rover device 604 may typically be configured to locate in proximity to the base station 602 (e.g., within 6 miles, 12 miles, etc.), the rover device 604 is likely to encounter similar errors as the base station 602 (e.g., similar ionospheric and tropospheric delays, etc.). Thus, the rover device 604 may use the correction data 614 from the base station 602 to improve and expedite its own computed position from the GNSS constellations to achieve centimeter precision. In other words, a base station may be configured to stay in a fixed/known location and send correction data to one or more rover devices, and the one or more rover devices may use the correction data to increase the precision of their positioning and also the speed of error correction. As such, the rover device 604 may determine its position using algorithms that incorporate ambiguity resolution and differential correction. The position accuracy achievable by the rover device 604 may depend on its distance from the base station 602 and the accuracy of the differential corrections (e.g., the correction data 614).

In some examples, a software or an application that accepts positioning related measurements from GNSS chipsets and/or sensors to estimate position, velocity, and/or altitude of a device may be referred to as a positioning engine. In addition, a positioning engine that is capable of achieving certain high level of accuracy (e.g., centimeter/decimeter level accuracy) and/or latency may be referred to as a precise positioning engine (PPE). For example, a positioning engine that is capable of performing RTK (e.g., receiving or processing correction data associated with RTK) may be considered as a PPE.

The accuracy of network-based positioning may depend on various factors, such as the capability of the UE, the location of the UE, the number of transmission-reception points (TRPs), etc. For example, a lower-end UE (or a UE with a lower capability) may have a lower transmission/reception capability and/or measurement capability compared to a higher-end UE (or a UE with a higher capability). Thus, the lower-end UE may provide a lower accuracy for the network-based positioning compared to the higher-end UE.

To improve the accuracy of network-based positioning, a positioning reference unit (PRU) may be used to assist a positioning device (e.g., a UE, a surveying equipment, an automobile GNSS system, etc.) in performing positioning. A PRU may be similar to an RTK base station. For example, a positioning engine may enable a positioning device to use measurement or correction information from a PRU to mitigate one or more error sources in the positioning device's measurements. Thus, better accuracy may be achieved by the positioning device.

In some examples, a PRU may refer to a device with a known location that is capable of performing positioning measurements (e.g., RSTD, RSRP, UE Rx-Tx time difference measurements, etc.) and reporting these measurements to a location server (e.g., an LMF). For example, a PRU may be a UE, or a TRP with a known location. In addition, a PRU may transmit SRS to enable one or more TRPs to measure and report UL positioning measurements (e.g., RTOA, UL-AoA, base station Rx-Tx time difference, etc.) from the PRU at a known location. The PRU measurements may be compared by a location server with the measurements expected at the known PRU location to determine correction information for other nearby target devices. The DL and/or UL location measurements for other target devices may then be corrected based on the correction information.

Figure 7:
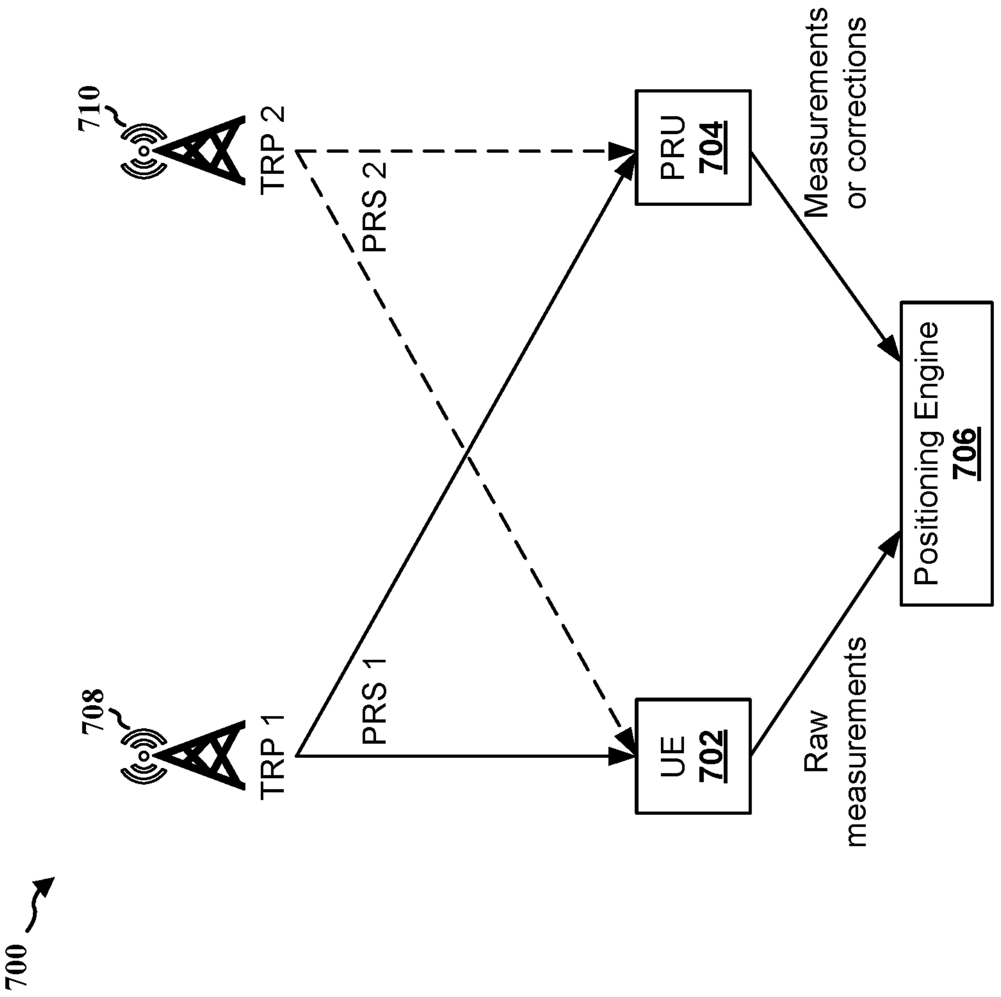
FIG. 7 is a diagram illustrating an example positioning reference unit (PRU) in accordance with various aspects of the present disclosure.

FIG. 7 is a diagram 700 illustrating an example PRU in accordance with various aspects of the present disclosure. A UE 702 may be configured to measure a first PRS (PRS 1) transmitted from a first TRP 708 and a second PRS (PRS 2) transmitted from a second TRP 710. A PRU 704 may also be configured to measure the first PRS transmitted from a first TRP 708 and the second PRS transmitted from a second TRP 710. Then, the PRU 704 may provide its measurements, assistance data, and/or correction data to other UEs (e.g., UEs in proximity to the PRU 704, such as the UE 702) to assist other UEs to achieve high accuracy positioning. For example, a positioning engine 706 (which may be located at the UE 702 or at the location server) may receive raw measurements from the UE 702 (e.g., for the first PRS and the second PRS) and the measurements/correction data from the PRU 704, and the positioning engine 706 may apply or fuse the measurements/correction data from the PRU 704 to the raw measurements from the UE 702 to mitigate/remove error(s) in the raw measurements.

The PRU 704 may be used for both territorial network (NT) based positioning and non-territorial network (NTN) based positioning. In some scenarios, a UE may have the capability to communicate with a server or another UE via an NTN. An NTN may refer to a network, or segments of a network, using at least one airborne device (e.g., an aircraft) or satellite (e.g., a low earth orbit (LEO) satellite, a medium earth orbit (MEO) satellite, a geostationary earth orbit (GEO) satellite, a high elliptical orbit (HEO) satellite, and/or a high-altitude pseudo satellite (HAPS), etc.) for communication (e.g., for transmitting data or receiving data). For example, an NTN may support a direct communication between a UE (e.g., a handset, a mobile phone, etc.) and a satellite (e.g., a LEO satellite, a GEO satellite, etc.), where the UE may transmit data (e.g., text messages and/or voice services, etc.) to another UE via the satellite. For purposes of the present disclosure, an NTN may include just NTN cell(s), or a mix of NTN cell(s) and ground cell(s). As such, for a positioning operation associated with an NTN, the positioning operation may involve NTN cell(s) without ground cell(s), a mix of NTN and ground cells, and/or hybrid solutions involving NTN cells, ground cells, GNSS satellites, and/or other ground-based positioning reference points such as WiFi, Bluetooth, etc. In some examples, a gateway associated with an NTN may be configured to function like a PRU.

In one example, an NTN architecture may be configured to be based on a transparent payload. For example, a data network (e.g., a 5G core (5GC) network) may connect to a base station (e.g., a network entity, an gNB) via a communication interface (e.g., a next generation (NG) interface). The base station may be located on the ground and connected to an NTN gateway, where the NTN gateway may be connected to an NTN payload (e.g., a network node embarked onboard a satellite, an unmanned aircraft systems (UAS), or HAPS, etc.) via a feeder link. An NTN gateway may refer to a node in the network that behave as a relay between satellite and UE because link budget may be limited between satellites and UE. The NTN gateway may have better Tx power or larger antenna to communicate with satellites compared to a UE. The NTN payload may connect to a UE via a service link (e.g., using the UE-UTRAN (Uu) interface). Under the transparent payload NTN architecture, the base station may be a ground station and the NTN payload (e.g., the satellite) may function like a relay, where the NTN payload may provide radio frequency filtering, frequency conversion, and/or amplification for data/payload received from the base station via the NTN gateway and relay/transmit the data/payload to the UE. As such, the waveform or signal relayed/repeated by the NTN payload may be un-changed.

The PRU 704 may be stationary or moving, and the PRU 704 may be any devices with capabilities to measure reference signals and/or transmitting reference signals. For example, the PRU 704 may be a UE/TRP/RSU that is capable of transmitting reference signals to other devices and/or receiving reference signals from other devices, etc. A PRU may greatly improve the accuracy of difference-based positioning as it is capable of measuring reference signals transmitted from multiple devices (e.g., TRPs). For purposes of the present disclosure, difference-based positioning may refer to any positioning methods/mechanisms that involve measuring difference(s) between two reception (Rx) nodes. For example, difference-based positioning may include double difference (DD)-time difference of arrival (TDoA) (DD-TDoA), DD-round-trip-time (RTT) (DD-RTT), single difference RTT (D-RTT), (same Tx, different Rx), D/DD-AoD, D/DD-AoA, D/DD-carrier phase, etc.

A PRU (e.g., the PRU 704) may send its measurements, assistance data, and/or correction data to a location server (e.g., an LMF) or to a UE (e.g., via sidelink (SL) or via the location server). For example, for UE-based positioning where a UE is configured to determine its own location, the UE may be specified to receive measurements, assistance data, and/or correction data from a PRU, and the UE may also be specified to know the locations of the PRU and the TRPs (e.g., for calculating its location). The correction data may be used by the UE for compensating (e.g., cancelling) various types of errors, such as TRP/UE group delays, synchronization error across TRPs, initial Tx/Rx carrier phase bias, and/or anchor location error, etc. In some examples, anchor location error cancellation may not be accurate if the PRU and the UE are far away from each other. For purposes of the present disclosure, a device that transmits reference signals and/or receives reference signals during a positioning of a UE may be referred to as an anchor. For example, an anchor may be a stationary TRP that transmits a PRS to a UE over a Uu link, an anchor may be a mobile UE that transmits reference signal to another UE over a sidelink (e.g., during sidelink positioning), or an anchor may be a satellite associated with an NTN that transmits GNSS signals to a UE, etc.

While a PRU may improve the accuracy of UE-based positioning for a UE, the UE may be specified to know the locations of the PRU and the corresponding anchors (e.g., TRPs, satellites, etc.) for determining/estimating its position. In some scenarios or regions, there may be a privacy concern or regulation about sharing anchor and/or PRU location information. For example, operators of networks (e.g., for NT and NTN) may have strong concern about revealing locations of its TRP(s), gateway(s), and/or PRU(s). When the PRU is a UE, the UE may also be specified to follow certain privacy protocols to protect the privacy of its user.

Aspects presented herein may enable a UE to achieve a high accuracy positioning without knowing the locations of certain network nodes, such as the PRU and the TRP(s). Aspects presented herein may enable a UE to perform positioning (e.g., UE-based positioning) using a virtual PRU (VPRU) and/or virtual anchors, such that the PRU/anchors may provide measurements, reference signals, assistance data, and/or correction data to the UE without disclosing their actual locations. In one aspect of the present disclosure, a VPRU may indicate that there is no physical PRU (PPRU) located at the claimed location of the VPRU, where measurements, assistance data, and/or correction data may be virtually generated for a UE based on the VPRU and or PPRU information/measurements. Thus, a network may generate a VPRU or a virtual reference station for a UE at any location. The measurements, assistance data, and/or correction data from a VPRU may be based on one or multiple physical PRUs' measurements, and/or based on the network resolving/tracking various error source values.

By enabling a UE to perform positioning using virtual anchors (e.g., TRPs/satellites), a carrier operator (e.g., the operator for a location server, an LMF, an NTN, etc.) may avoid releasing/providing accurate or true locations of their network nodes such as anchor base stations and/or anchor satellites, etc., thereby maintaining the privacy and security for these network nodes. In addition, for moving anchors such as a mobile UE associated with sidelink positioning or a LEO satellite associated with an NTN, the locations of these moving anchors may be difficult to estimate and share to a UE in real-time. Thus, using virtual anchors may be more suitable and convenient for the UE to perform the positioning. Aspects presented herein may enable ground truth locations of anchors to be protected with noise, where the positioning accuracy may be degraded if a UE uses the noisy anchor location information without a PRU. Similarly, by enabling a UE to perform positioning using a VPRU, a carrier operator or a PRU may also avoid releasing/providing the accurate or the true ground location of the PRU, thereby maintaining the privacy and security for the PRU. The location of a VPRU may be pre-assigned (e.g., which may be more suitable for an NTN) or generated based on the location of a target UE (e.g., the generated VPRU is in proximity to the target UE). Aspects presented herein may enable a UE to achieve a high-accuracy positioning by enabling the UE to cancel the common anchor location errors (e.g., using correction data from a PRU). Also, while physical PRUs may not be able to receive measurements and/or signals from the same set of anchors as a UE, using a VPRU may enable measurements from the VPRU are associated with one or more common anchors of the UE. In other words, using a virtual PRU may guarantee the measurements are from common anchors.

In one aspect of the present disclosure, a network may generate a virtual anchor (e.g., a virtual TRP, a virtual UE, or a virtual satellite, etc.) by applying a distance/vector offset (which may also be referred to as a noise or an error) to the actual location (which may also be referred to as the ground truth location) of an anchor. In general, for UE-based positioning, a location server may send to a target UE (e.g., a UE whose location is to be determined) the accurate locations of anchors participating the positioning (e.g., TRP(s), UE(s), and/or satellite(s), etc.), such as via assistance data. However, by using virtual anchors, the network may send noisy/virtual anchor locations to the UE instead.

Figure 8:
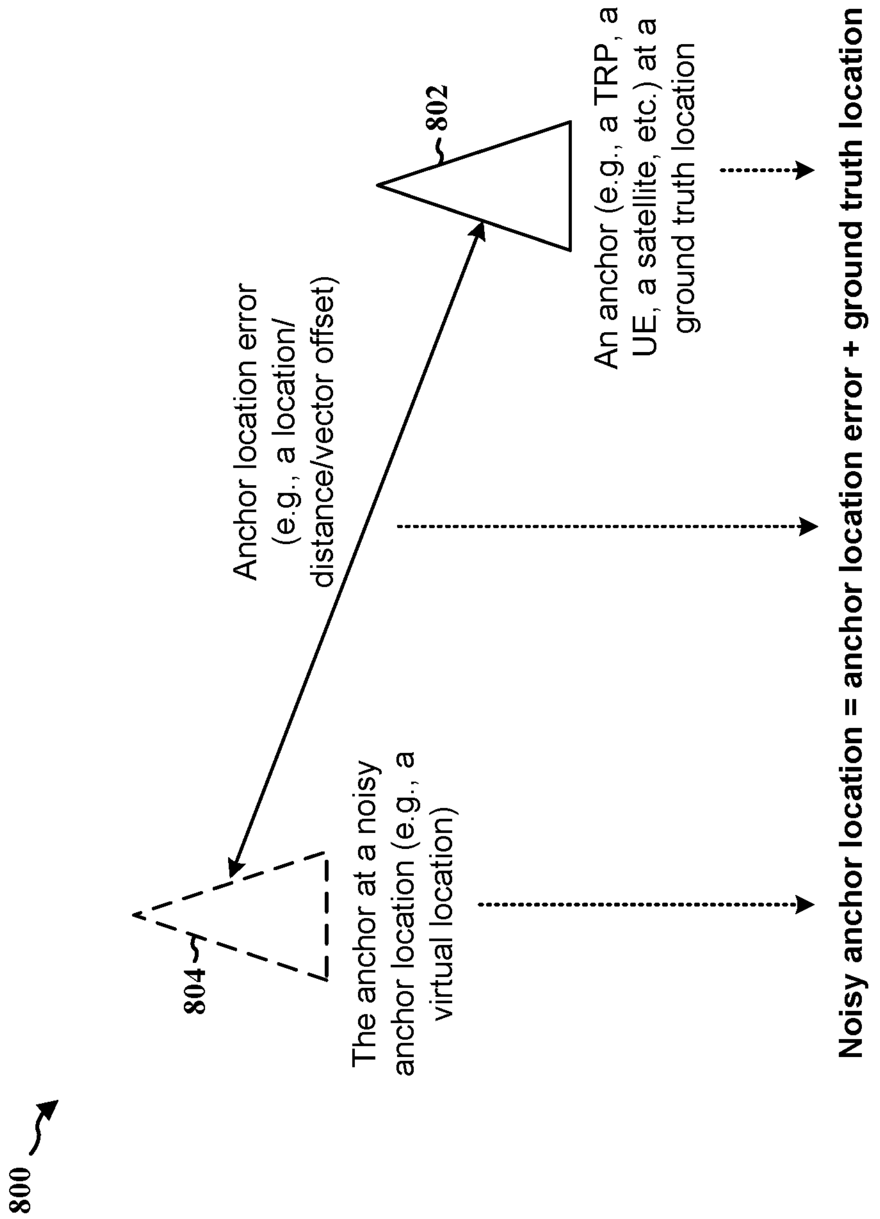
FIG. 8 is a diagram illustrating an example of generating a virtual anchor or protecting the true location of a physical anchor in accordance with various aspects of the present disclosure.

FIG. 8 is a diagram 800 illustrating an example of generating a virtual anchor or protecting the true location of a physical anchor in accordance with various aspects of the present disclosure. In one example, as shown at 802, a physical anchor (e.g., a TRP) may be located at a ground location, which may be referred to as a ground truth location. For an anchor that is mobile (e.g., a UE, a satellite, etc.), the ground truth location may correspond to the current location of the anchor (which may be in the sky/space for the satellite).

As shown at 804, to generate a virtual anchor (or to protect the ground truth location of the physical anchor), a network may apply an anchor location error to the ground truth location of the physical anchor, such that a virtual anchor is generated at a virtual location, which may be referred to as a noisy anchor location. In other words, the noisy anchor location of the virtual anchor may equal to the ground truth location of the physical anchor plus the anchor location error (e.g., noisy anchor location=ground truth location+anchor location error). For example, the anchor location error may correspond to a distance/vector offset that sets the virtual anchor X meters/kilometers from the physical anchor in a certain direction. In another example, the anchor location error may correspond to a coordinate offset that sets the virtual anchor at specified latitude and longitude of the geographic coordinate system. In some examples, based on the privacy specification, the mean and/or the variance of the anchor location error may be configured to vary. For example, the anchor location error may follow certain types of distributions for privacy protection (e.g., a Laplace distribution, truncated Gaussian, etc.). In some examples, an anchor location error may apply to multiple physical anchors to generate multiple virtual anchors. In other examples, different anchor location errors may apply to different physical anchors.

After generating the virtual anchor, the network may configure a UE to perform the positioning with the virtual anchor based on the noisy anchor location of the virtual anchor (and also based on a VPRU discussed below). For example, the network may provide the UE with a list of virtual anchors with their noisy anchor locations via assistance data, such that the UE may perform the positioning with one or more virtual anchors in the list of virtual anchors based on their noisy anchor locations. In some examples, a new virtual anchor location information element (IE) may be added to the assistance data for certain positioning schemes, such as for UE-based positioning with double difference (DD)-based schemes. As a UE may not be aware that an anchor is a virtual anchor, the virtual anchor location IE may indicate to the UE that certain anchors are virtual anchors. For a virtual anchor, the UE may transmit reference signals (e.g., SRS) to the virtual anchor and/or receive reference signals (e.g., PRS) from the virtual anchor, where the signals will be transmitted from and received by the corresponding physical anchor. In other words, the UE may treat a virtual anchor as a physical anchor.

In one aspect of the present disclosure, a network may generate a virtual PRU (VPRU) or a set of VPRUs based on one or more physical PRUs, where the physical PRUs may be configured to receive reference signals from one or more anchors and/or transmit reference signals to one or more anchors. Then, the physical PRUs may transmit their measurements for the one or more anchors to a server, such as a location server or an LMF. Based on the measurements from the one or more physical PRUS, the server may generate one or more VPRUs that may be used for assisting a UE for positioning.

Figure 9:
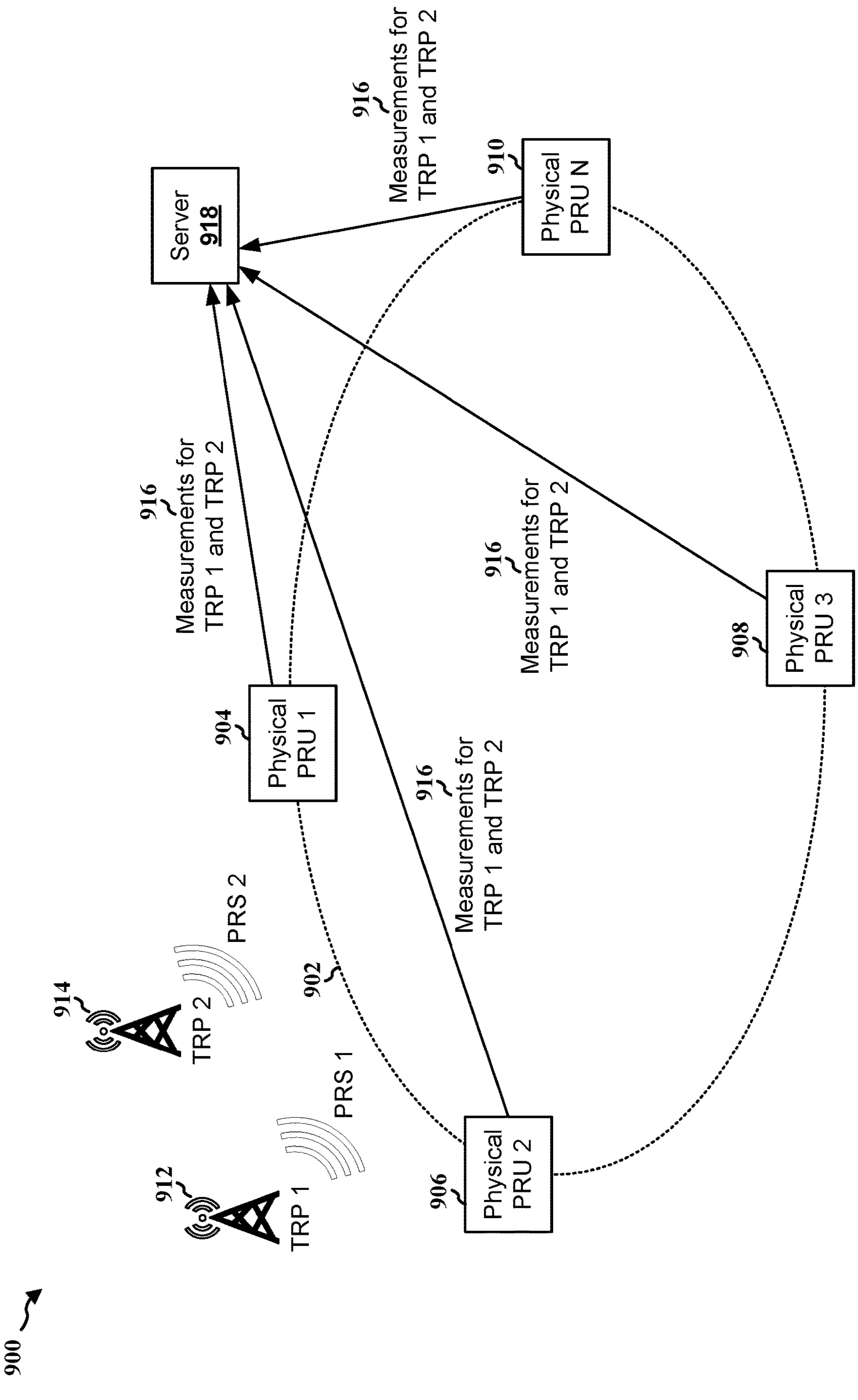
FIG. 9 is a diagram illustrating an example of creating a virtual PRU (VPRU) based on a set of physical PRUs in accordance with various aspects of the present disclosure.
Figure 10:
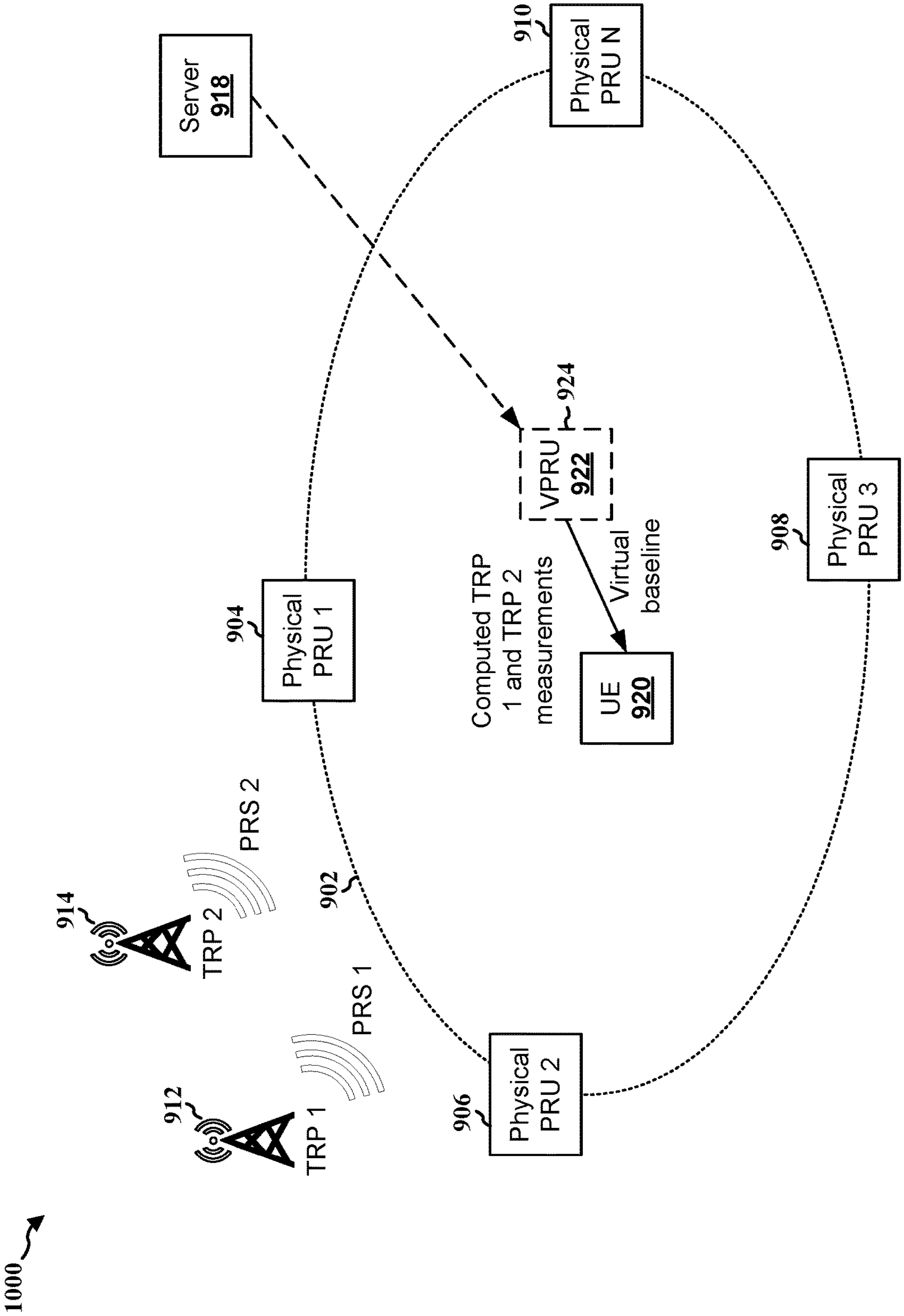
FIG. 10 is a diagram illustrating an example of creating a VPRU based on a set of physical PRUs in accordance with various aspects of the present disclosure.

FIGS. 9 and 10 are diagrams 900 and 1000 illustrating an example of creating a VPRU based on a set of physical PRUs in accordance with various aspects of the present disclosure. As shown by the diagram 900 of FIG. 9, a given area 902 may have a set of physical PRUs, which may include a first physical PRU 904, a second physical PRU 906, a third physical PRU 908, and up to an $N^{th}$ physical PRU 910, etc. The set of physical PRUs may be configured to measure/receive reference signals transmitted from one or more anchors and/or transmit reference signals to the one or more anchors. For example, the set of physical PRUs may measure PRSs transmitted from a first TRP 912 and a second TRP 914 and/or transmit SRSs to the first TRP 912 and the second TRP 914.

Then, as shown at 916, the set of physical PRUs may transmit their measurements to a server 918 (e.g., a network entity such as a location server or an LMF). In some examples, the measurements may include TDoA of PRSs transmitted from the first TRP 912 and the second TRP 914, the RTT between a PRU and a TRP, the AoA of a PRS, and/or the carrier phase of a PRS, etc. The server 918 may also collect uplink (UL) measurements from the first TRP 912 and the second TRP 914 (e.g., for measuring reference signals transmitted from the set of physical PRUs).

As shown by the diagram 1000 of FIG. 10, when a UE 920 is performing UE-based positioning in the given area 902 and is configured to measure PRSs transmitted from the first TRP 912 and the second TRP 914, the server 918 may generate a VPRU 922 at a virtual location that is in proximity to the UE 920, such as shown at 924. The server 918 may also compute/calculate a set of measurements, assistance data, and/or correction data for the VPRU 922 based on measurements from the set of PRUs, the first TRP 912, and/or the second TRP 914, etc. For example, based on the TDoA measurements from the first physical PRU 904 and the third physical PRU 908 for the PRSs transmitted from the first TRP 912 and the second TRP 914, the server 918 may estimate the TDoA measurement of a PRU (e.g., a virtual PRU) that is located between the first physical PRU 904 and the third physical PRU 908 (e.g., the TDoA measurement may be closer to the first physical PRU 904 if the VPRU 922 is set closer to the first physical PRU 904, and the TDoA measurement may be closer to the third physical PRU 908 if the VPRU 922 is set closer to the third physical PRU 908, etc.). In one example, the measurement of the VPRU 922 may be based the geometric interpolation between measurements from the set of physical PRUs (e.g. based on distance from the VPRU 922 to physical PRUs 904, 906, 908, 910, etc.). In another example, measurements from the set of physical PRUs may be used for estimating the error (e.g., synchronization error, group delays, etc.). Then, the estimated error may be added the error-free virtual measurements of the VPRU 922 (e.g., based on the ground truth of VPRU location and anchor locations (include location error)). As an illustration, the server 918 may estimate the RSTD error between the first TRP 912 and the second TRP 914 based on the third physical PRU 908, then the server 918 may add the estimated RSTD error to VPRU 922's error free RSTD measurement. Similarly, the server 918 may estimate the RSTD error between the first TRP 912 and the second TRP 914 based on the first physical PRU 904, and the server 918 may the estimated RSTD add to VPRU's error free RSTD measurement. Then, the server 918 may transmit the generated measurements, assistance data, and/or correction data associated with the VPRU 922 (and also the virtual location of the VPRU 922) to the UE 920. Based on the measurements, assistance data, correction data and/or the location of the VPRU 922, the UE 920 (or a positioning engine of the UE) may calculate/estimate its position as described in connection with FIG. 7, such as applying the correction data to the UE 920's own measurement or fusing the measurements associated with the VPRU 922 with the measurements of the UE 920, etc.

Figure 11:
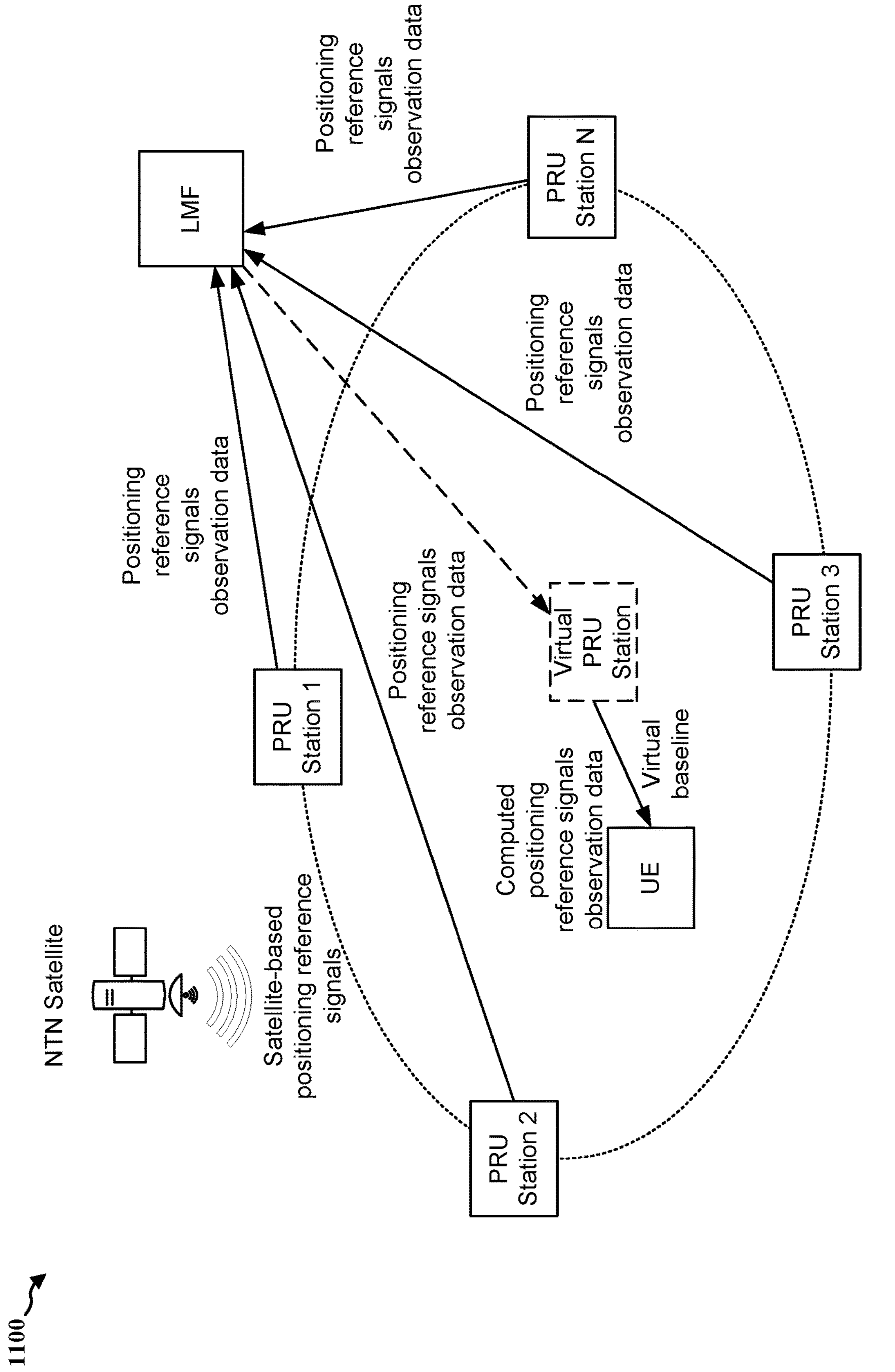
FIG. 11 is a diagram illustrating an example of generating a virtual PRU base station based on one or more physical PRU base stations in accordance with various aspects of the present disclosure.

FIG. 11 is a diagram 1100 illustrating an example of generating a virtual PRU base station for NTN-based positioning based on one or more physical PRU base stations in accordance with various aspects of the present disclosure. Similar to generating a VPRU based on a set of physical PRUs, a virtual PRU base station may be generated by an NTN network based on a set of physical PRU base stations associated with the NTN. For example, a set of physical PRU base stations, which may include a first physical PRU base station, a second physical PRU base station, a third physical PRU base station, and up to an $N^{th}$ physical PRU base station, etc., may be configured to measure/receive positioning reference signals transmitted from one or more satellites. Then, the set of physical PRU base stations may transmit their positioning reference signals measurements or positioning reference signals observation data for the one or more satellites to an LMF.

Then, when a UE is configured to estimate its location, the LMF may generate a virtual PRU base station at a virtual location that is in proximity to the UE. The LMF may also compute/calculate a set of positioning reference signals measurements/observation data for the virtual PRU base station. As such, the UE may determine its position using the positioning reference signals measurements/observation data for the virtual PRU base station without knowing the ground truth location(s) or the physical PRU base station(s).

Using a virtual PRU base station may reduce a total number of physical PRU base stations deployed in an area. For example, a physical PRU base station may provide a service coverage radius of approximately 20-30 km. If the distance between two physical PRU base stations are approximately 50 km apart and each physical PRU base station just serves nearby UEs, more than 4000 PRU base stations may be specified to cover the United States continental.

On the other hand, when a virtual PRU base station is used, the distance between two physical PRU base stations may be configured to be further apart, such as between 100 to 200 km, as a virtual PRU base station may be generated for a UE based on the location of the UE. In other words, the UE may not be specified to locate in proximity to a physical PRU base station in order to receive corresponding correction data from the physical PRU base station. The LMF may collect data from physical PRU base stations, estimate the spatial distribution of correlated errors for virtual PRU base stations, and transmit corrections to the UEs based on the virtual PRU base stations. Such configuration may significantly reduce the density of physical PRU base stations to be deployed (e.g., just 400 PRU base stations may be specified to cover the United States continental instead of 4000). This may also improve the positioning performance at a client (e.g., UE) side.

In some examples, for an LMF to generate a virtual PRU base station close to a UE and calculate positioning reference signals observations for the virtual PRU base station, the PRU server may be specified to know the location (e.g., the true location or an estimated location) of the UE. The LMF may fix the carrier phase ambiguities between physical PRU base stations, and calculate the errors for each physical PRU base station. Then, the LMF may interpolate the estimated PRU base station errors to the location of the virtual PRU base station. The processing of the PRU correction data at a UE may be the same as for a physical-based PRU base station. For example, the LMF may provide semi-synthetic positioning reference signals observations (e.g., observed from the virtual PRU base station) to a UE. In response, the UE may calculate a virtual baseline from the UE to the virtual PRU base station, and the UE may use the virtual baseline and PRU correction data to determine its location.

As discussed in connection with FIGS. 9 to 11, for a VPRU or a virtual RTK base station (collectively as a "virtual reference station" or a "VRS" hereafter) to provide helpful/useful measurements, assistance data, and/or correction data to a UE, the virtual location of the VRS may be configured to be as close to an actual location or an estimated location of the UE as possible. In some examples, for the best common anchor error cancellation, a short baseline (e.g., a threshold distance) between a UE and a PRU (or a VRS) may be specified or defined. For example, the ratio between the range from an anchor to a UE and the range from a PRU to the UE (e.g., ratio=anchor-UE range/PRU-UE range) may be configured to exceed or maintain certain ratio threshold (which may be a large value). If an anchor is a GNSS satellite, the ratio may be around 20000 km/1 km. In other words, if the range between the GNSS satellite and a UE is approximately 20000 km, then the distance between the UE and a PRU/VPRU may be specified to be within 1 km.

In one aspect of the present disclosure, the locations of VRSs (e.g., VPRUs, virtual PRU base stations, etc.) may be pre-assigned by a network to a list of locations or based on a predefined rule. In some examples, such configuration may be more suitable for an NTN.

Figure 12:
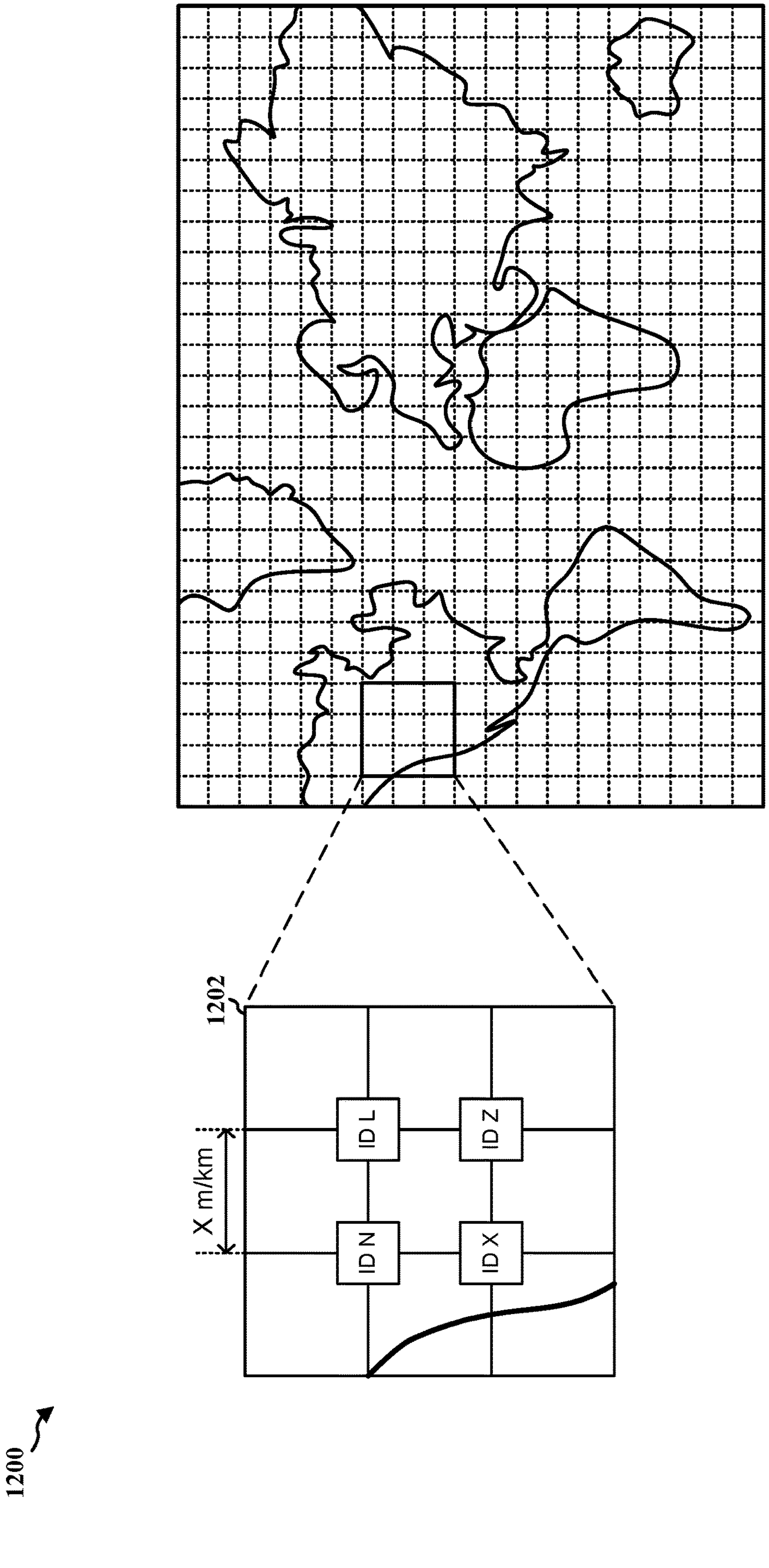
FIG. 12 is a diagram illustrating an example of pre-assigning locations of virtual reference stations (VRSs) in accordance with various aspects of the present disclosure.

FIG. 12 is a diagram 1200 illustrating an example of pre-assigning locations of VRSs in accordance with various aspects of the present disclosure. In one example, a network may generate a grid of X meters (m) or kilometers (km) on Earth, where the grid size may be pre-defined (e.g., 1 m, 2 m, 5 m, etc. for indoor applications, and 5 km, 10 km, 50 km, etc. for outdoor applications). Then, the network may associate each cross point on the grid with an identifier (ID). For example, as shown at 1202, a first cross point on the grid may be associated with a first ID (e.g., ID N), a second cross point on the grid may be associated with a second ID (e.g., ID L), and a third cross point on the grid may be associated with a third ID (e.g., ID N), etc. Then, the IDs and their corresponding locations may be used by the network for assigning VRSs. For example, the network may generate a VPRU or a virtual PRU base station at each cross point.

This grid information may also be pre-programmed to a UE or transmit to the UE upon request (e.g., in response to an assistance data request). Based on the grid information, the UE may request difference services (e.g., positioning services) from the network for using a specific VRS directly. For example, if the UE is in proximity to the cross point with ID N, the UE may request the network to provide a VPRU at that cross point based on the corresponding ID (e.g., the UE may indicate the ID N to the network). On the other hand, if the UE does not request for a specific VRS, the network may provide a VRS which the network believes to be close (or closest) to the UE.

In another aspect of the present disclosure, the locations of VRSs may be generated based on the location of a UE (or a rover device). This may be more suitable for a TN. For example, based on a rough estimation of a UE's location, a network server (e.g., a location server or an LMF) may determine a VRS location that is as close to the rough estimated as possible. In one example, the rough estimation of the UE's location may be determined based on the UE's serving cell ID, the UE's serving beam ID, the UE's enhanced cell ID (ECID), a previous estimated location of the UE, a UE reported location, and/or RAN-independent location estimate. In another example, the UE may send a difference-based positioning request to the network server with its coarse/previous location for a VRS. For example, the UE may send the network server its coarse location, and the network server may generate a VRS for the UE based on the coarse location of the UE.

In another example, the rough estimation of the UE's location may be determined based on sidelink (SL) zone ID(s) associated with the UE. For example, in some network implementations, a UE may determine an identity of the zone (i.e., a zone ID) in which it is located using the following formula, if sidelink zone configuration (sl-ZoneConfig) is configured:

$$x_1=\text{Floor}(x/L)\text{Mod }64;$$

$$y_1=\text{Floor}(y/L)\text{Mod }64;$$

$$\text{Zone\_id}=y_1*64+x_1.$$

L may indicate the value of the sidelink zone length (sl-ZoneLength) and may be included in sidelink zone configuration (sl-ZoneConfig). In other words, the sidelink zone configuration may define the sidelink zone length. In some examples, the sidelink zone length may be configured to be 5, 10, 20, 30, 40, or 50 meters long, which may be suitable/reasonable range for SL-based positioning. x may indicate the geodesic distance in longitude between the UE's current location and geographical coordinates (0, 0) according to a World Geodetic System (e.g., WGS84 model) and it is expressed in meters. y is the geodesic distance in latitude between the UE's current location and geographical coordinates (0, 0) according to the World Geodetic System and it is also expressed in meters. As such, the zone ID of the UE may be calculated using current location of the UE and the geographical coordinate. In some examples, the initial location of the UE (which may be coarse) may be estimated by the UE with the assistance of the network.

For cellular based positioning (e.g., positioning based on terrestrial network), the range between an anchor and a UE (e.g., between a TRP and a UE) may be much smaller compared to GNSS or non-terrestrial network scenarios (e.g., between a satellite and a UE). Therefore, multiple iterations of double differencing (DD) and VRS may be specified so that the location of the UE may gradually converge to a final location estimate. In each iteration, the VRS location may be different. For example, based on the initial coarse location of the UE, the network may generate a VPRU at a first location that is in proximity to the coarse location of the UE. Then, based on subsequent measurements from the UE, the network may have a better estimate of the UE's current/actual location, and the network may generate another VPRU in proximity to the current estimated location of the UE. The network may continue to repeat this process/iteration until certain conditions are met, such as when the final location estimate of the UE reaches certain accuracy threshold. For example, an exit condition for iterations may be covariance based, delta-based (e.g., |L_(i−1)−L L_(i)|), or ratio based, (e.g., ratio of anchor-UE range/PRU-UE range), etc.

As discussed in connection with FIGS. 9 to 11, after a server generates a VRS (e.g., a VPRU, a virtual PRU base station, etc.), the server may also generate measurements, assistance data, and/or correction data associated with the VRS (which may be referred to as "virtual/VRS measurements assistance data, and/or correction data" hereafter), such that a client device (e.g., a UE, a rover device, etc.) may use the generated measurements, assistance data, and/or correction data to assist its positioning (as if the VRS is an actual physical unit/device). In another aspect of the present disclosure, a network or a server may generate the VRS measurement, assistance data, and/or correction data for a VRS based on the location of the VRS, the noisy anchor locations (e.g., the virtual location of anchors), and error source estimation.

Figure 13:
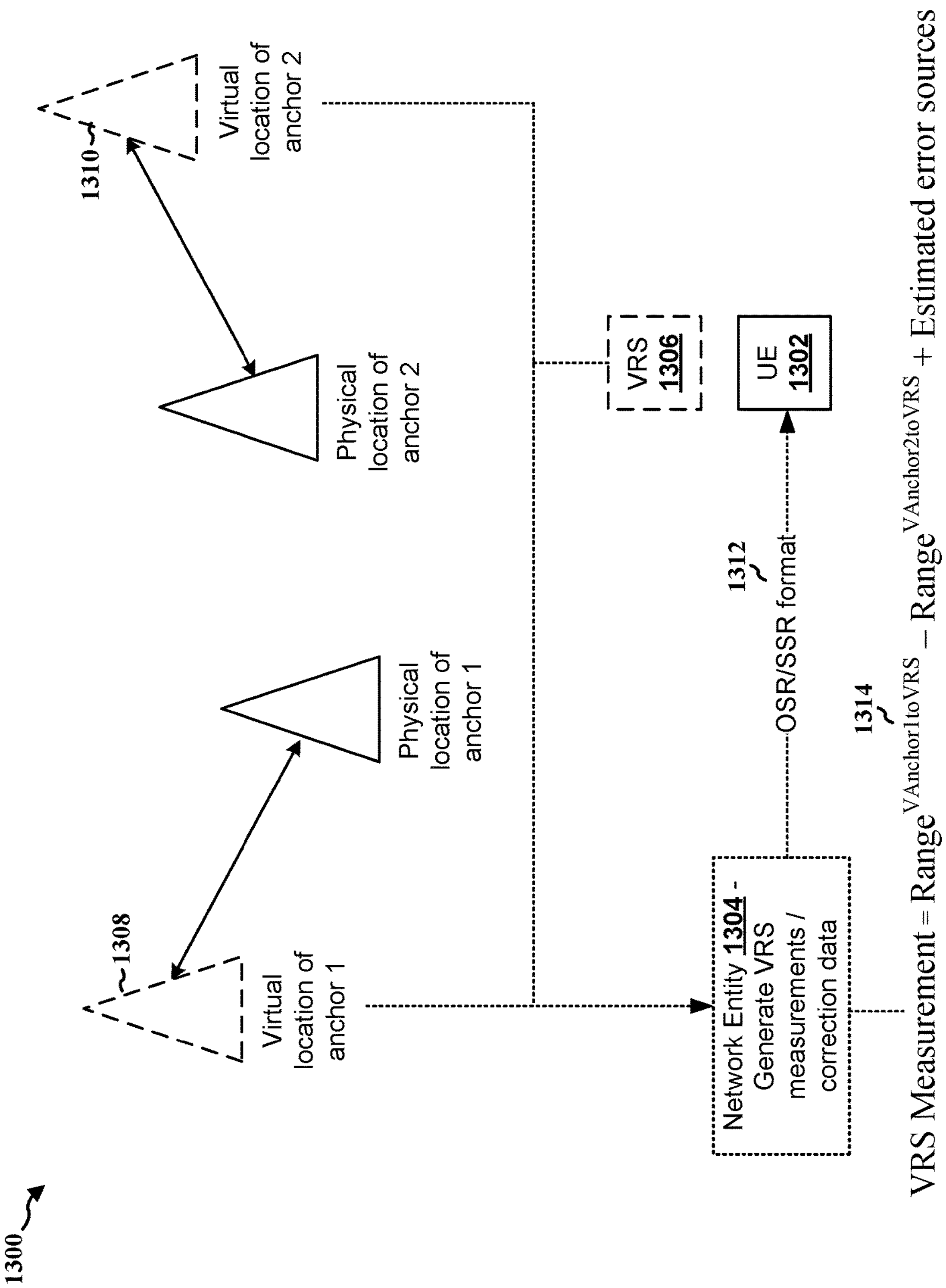
FIG. 13 is a diagram illustrating an example of generating VRS measurement, assistance data, and/or correction data in accordance with various aspects of the present disclosure.

FIG. 13 is a diagram 1300 illustrating an example of generating VRS measurement, assistance data, and/or correction data in accordance with various aspects of the present disclosure. In one example, a UE 1302 may be configured to perform UE-based positioning (e.g., the UE is determining its own location), such as difference-based positioning, and the UE 1302 may send a positioning request to a network entity 1304, which may be a location server or an LMF.

In response, the network entity 1304 may provide assistance data to the UE 1302 that includes a set of virtual anchors (e.g., as described in connection with FIG. 8) and at least one VRS (e.g., as described in connection with FIGS. 9 and 10) in which the UE 1302 may use for the positioning. For example, based on the assistance data, the UE 1302 may select a first virtual anchor 1308 (VAnchor1) with a corresponding noisy anchor location (e.g., a first virtual anchor location), a second virtual anchor 1310 (VAnchor2) with a corresponding noisy anchor location (e.g., a second virtual anchor location), and a VRS 1306 that is configured to be in proximity to the UE 1302 (e.g., at a virtual VRS location).

In one example, to generate VRS measurements, assistance data, and/or correction data for the VRS 1306, the network entity 1304 may determine each measurement, assistance data, and/or correction data based on the location of the VRS 1306, the noisy anchor locations of the first virtual anchor 1308 and the second virtual anchor 1310, and an error source estimation (which may also be referred to as an estimated error source). As discussed in connection with FIG. 8, the noisy anchor location for a virtual anchor may be based on applying an anchor location error to the ground truth location of a physical anchor (e.g., physical anchor locations with intrinsic error and uncertainty). The error source estimation may include one or more error sources such as anchor clock bias (e.g., NTN satellite clock), hardware group delay(s) (e.g., delays at TRPs), atmospheric effect (e.g., ionospheric and/or tropospheric delay for NTN), non-line-of-sight (NLOS) effect (if applicable), and/or other applicable effects such as Earth rotation effects (e.g., Sagnac effect), tide effects, nutation, relativities, etc.

In one aspect, the estimation and tracking of these error sources may be performed at the network entity 1304 or at a PRU (e.g., a physical PRU that is used for generating the VPRU as described in connection with FIGS. 9 and 10). If the estimation and tracking of the error sources are performed by the network entity 1304, multiple physical PRUs may be configured to take measurements and report either raw measurements or corrections to the network entity 1304, such as described in connection with FIG. 9. On the other hand, if the estimation and tracking of the error sources are performed by the PRU(s), the network entity 1304 may decentralize the error estimation to the PRU(s). In other words, each PRU may keep track of their own estimated error sources and provide them to the network entity 1304 based on demand (e.g., after being requested by the network entity 1304).

In one example, as shown at 1312, the network entity 1304 may broadcast the tracked/estimated error sources based on an observation space representation (OSR) format or a state space representation (SSR) format, where the OSR format may use one field/value to cover all (multiple) error sources and the SSR format may estimate and broadcast each error source.

In another example, as shown at 1314, the VRS measurement for the VRS 1306 may be calculated based on the ranges between virtual anchors to the VRS 1306 and the error sources. For example, the network entity 1304 may calculate the virtual received signal time difference (RSTD) for signals transmitted from the first virtual anchor 1308 to the VRS 1306 and the signals transmitted from the second virtual anchor 1310 to the VRS 1306 by subtracting the range between the second virtual anchor 1310 to the VRS 1306 (V Anchor2toVRS) from the range between the first virtual anchor 1308 to the VRS 1306 (VAnchor1toVRS) and adding the estimated error source: sample Virtual $RSTD=Range^{VAnchor1toVRS}-Range^{VAnchor2toVRS}+$Estimated error sources. As anchor location errors may be cancelled out after the UE 1302 or a positioning engine performs differencing measurements between the UE 1302 and the VRS 1306, aspects presented herein may enable the UE 1302 to perform UE-based positioning using virtual anchors and VPRU(s). As such, the network entity 1304 may avoid disclosing the truth ground locations of the physical anchors and PRUs, thereby protecting the privacy and integrity of the physical anchors and PRUs.

FIG. 14 is a communication flow 1400 illustrating an example of a network entity configuring virtual anchors and VPRUs for a UE in accordance with various aspects of the present disclosure. The numberings associated with the communication flow 1400 do not specify a particular temporal order and are merely used as references for the communication flow 1400.

At 1420, a UE 1402 may transmit an indication to perform UE-based positioning to a network entity 1404 (e.g., a location server, an LMF, etc.). The UE 1402 may transmit the indication directly to the network entity 1404, or via another network node (e.g., a serving base station). The UE-based positioning may include at least one difference-based positioning method, such as DD-TDoA, DD-RTT, single difference RTT, D/DD-AoD, D/DD-AoA, D/DD-carrier phase, etc. In some examples, the indication may be transmitted via an assistance data request message and/or via a capability report. In some implementations, a UE may not be able to decide the positioning scheme (e.g., UE-based positioning or UE-assisted positioning), where such decision is made by the network entity (e.g., the LMF). However, the UE may report its capability to the network entity/server, and the UE and the network entity/server may negotiate with each other to confirm whether the positioning is UE-based or UE-assisted.

At 1422, in response to the UE 1402's indication to perform the UE-based positioning, the network entity 1404 may configure assistance data 1406 for the UE 1402, where the assistance data 1406 may include a list of virtual anchors 1408 and a list of VPRUs 1410 for the UE-based positioning, such as described in connection with FIGS. 8-11 and 13.

At 1424, the network entity 1404 may transmit the assistance data 1406 to the UE 1402 that includes the list of virtual anchors 1408 and the list of VPRUs 1410.

In one example, as shown at 1428, the network entity 1404 may generate the list of virtual anchors 1408 based on a location/vector offset (e.g., an anchor location error) to each physical anchor in a set of physical anchors, such as described in connection with FIG. 8

In another example, as shown at 1430, the network entity 1404 may generate the list of VPRUs 1410 based on at least one physical PRU, where each VPRU may be associated with a corresponding virtual location, such as described in connection with FIGS. 9-11.

In another example, the network entity 1404 may select the list of VPRUs 1410 based on the corresponding virtual location of each VPRU and an estimated location of the UE 1402, such as described in connection with FIGS. 10 and 11.

In another example, a ratio between a first approximate distance from the estimated location of the UE 1402 to the list of virtual anchors 1408 and a second approximate distance from the estimated location of the UE to the list of VPRUs 1410 may be configured to exceed a ratio threshold, such as described in connection with FIGS. 10 and 11.

In another example, as described in connection with FIG. 12, the corresponding virtual location for each VPRU in the list of VPRUs 1410 may be pre-assigned or pre-configured. For example, the virtual location for each VPRU may correspond to a cross point of a grid covering a specific area.

In another example, as described in connection with FIGS. 10 to 12, the corresponding virtual location for each VPRU in the list of VPRUs 1410 may be generated based on an estimated location of the UE 1402. In some implementations, the network entity 1404 may determine the estimated location of the UE 1402 based on a serving cell ID associated with the UE 1402, a serving beam ID associated with the UE 1402, an enhanced cell ID (ECID) associated with the UE 1402, a previous location estimate of the UE 1402, a location reported by the UE 1402, a SL zone ID associated with the UE 1402, and/or a radio access network (RAN)-independent location estimate of the UE 1402.

In another example, as shown at 1432, the UE 1402 may transmit a request for using a suitable or favored VPRU (or multiple suitable or favored VPRUs) to the network entity 1404. In response, the network entity 1404 may configure the assistance data 1406 to include the suitable or favored VPRU(s) in the list of VPRUs 1410 based on the request.

In another example, as shown at 1434, the UE 1402 may indicate to the network entity 1404 to use a specified VPRU for the positioning, such as a VPRU 1412. At 1436, in response to the indicated VPRU, the network entity 1404 may generate a set of measurements or correction data for the VPRU 1412 based on the virtual location of the VPRU 1412 and the virtual locations of one or more virtual anchors. At 1438, the network entity 1404 may transmit the set of measurements or correction data associated with the VPRU 1412 to the UE 1402, such as described in connection with FIG. 13. In one example, the indication transmitted by the UE 1402 at 1434 and 1432 may be the same. In another examples, the network entity 1438 may transmit the set of measurements or correction data for the VPRU 1412 via the assistance data 1406 (if the network entity 1404 knows the UE 1402 is using the VPRU 1412). In another example, the network entity 1404 may generate a set of measurements or correction data for each VPRU in the list of VPRUs 1410

(e.g., based on a virtual location for each VPRU in the list of VPRUs 1410 and the list of virtual anchors 1408), and the network entity 1404 may transmit the set of measurements or the correction data to the UE for the UE-based positioning based on which VPRU is used by the UE 1402.

In one example, as described in connection with FIG. 13, the set of measurements or the correction data may be generated based on one or more error sources such, an anchor clock bias, a group delay, an atmospheric effect or delay, a non-line-of-sight (NLOS) effect, and/or at least one environmental effect. The network entity 1404 may estimate or track the one or more error sources based on raw measurements received from a set of physical PRUS.

In another example, the network entity 1404 may broadcast the one or more error sources to multiple UEs (including the UE 1402) based on an observation space representation (OSR) format or a state space representation (SSR) format.

At 1426, based on the assistance data 1406, the UE 1402 may perform the UE-based positioning using at least one virtual anchor and/or at least one VPRU, such as described in connection with FIGS. 7, 10, and 13.

In another aspect of the present disclosure, for a network (e.g., a location server, an LMF, etc.) to configure virtual anchors and/or VRS(s) for a UE, certain information may be specified to be included in the assistance data request from the UE and/or in the assistance data from the network. In one example, when a UE sends an assistance data request to a network (e.g., an LMF), such as described in connection with 1420 of FIG. 14, the assistance data request may include the location of the UE (e.g., a coarse location, an estimated location, or an exact location, etc.) and/or a list of observable anchors.

It may be beneficial for a UE to include its location in the assistance data request as it may enable the network to provide a VRS that is as close to the UE as possible. However, for UE-based positioning, the UE may not be specified to report its location if the client (consumer) is UE itself. In other words, the network may not be specified to know the UE's location. In some scenarios, the network may not know UE's current or history location(s) for UE-based positioning. Therefore, to reduce/minimize the range between the UE and a VRS, UE may be specified to provide/add its location information to the network for VRS-based high-accuracy positioning. The location estimation may be based on the previous location estimate using the same positioning method, other RAN-independent methods, serving cell, etc., such as described in connection with FIG. 12.

It may also be beneficial for a UE to include a list of observable anchors (e.g., anchors that can be detected/observed by the UE) in the assistance data request as it may enable the network to configure more suitable virtual anchor correction data/measurements for the UE. For example, based on the PRS reception at a UE (e.g., the signal-to-noise ratio (SNR) and/or the reference signal received power (RSRP) measured for the received PRS), a UE may observe a subset of anchors (e.g., anchors with good link quality or link quality above a quality threshold). Then, the UE may send information associated with these observable anchors to the network.

In some scenarios, as the network may generate a VRS at a virtual location with customized VRS measurements/correction data, such as described in connection with FIG. 13, the customized VRS measurements/correction data may be more accurate if both the UE and the VRS (e.g., a VPRU) have common measurements with anchors. Also, compared with GNSS-based positioning, aspects presented herein may enable the UE to establish a two-way communication link with a location server (e.g., the VRS) while most of GNSS RTK/PPP may use a unidirectional communication link (broadcasting correction data). In some examples, to save resource and to achieve better positioning performance, a UE may request VRS measurements with a set of anchors that UE observes. Then, the network may generate customized VRS measurements based on the UE's request instead of VRS measurements with all the anchors.

When a network (e.g., an LMF) sends assistance data to a UE, such as described in connection with 1424 of FIG. 14, the assistance data may include a virtual anchor group and/or a PRU type field/indication. For example, a virtual anchor group ID may be added in the assistance data for the UE-based positioning, where each virtual anchor group ID may be associated with (or contain) a set of noisy anchor locations (e.g., ground truth location+anchor location error). Such configuration may be suitable for roaming scenarios, where these anchor group information (e.g., virtual anchor group ID+noisy anchor location) may be shared/synchronized across network nodes which support difference-based positioning (e.g., single difference and double difference) and VRS. Thus, when a UE enters a new region and/or move/handover to a different network (e.g., to another LMF), the UE may send its virtual anchor group ID to the network in the assistance data request. Then, the network could know about the noisy anchor locations and generate VRS measurements/correction for the VRS used by the UE.

In some scenarios, it may be beneficial for a network to indicate to a UE whether a PRU is a VPRU or a physical PRU, such as by including a PRU type field in the assistance data for the UE. For example, a bit field or an integer field may be used to indicate whether a PRU in a list of PRUs is a VPRU or a physical PRU. As a UE may be specified to establish a direct connection with a PRU (e.g., a SL connection, an Uu connection, etc.) in some cases, the UE may avoid trying to establish a connection with a VPRU if the UE is aware that it is a virtual device. On the other hand, if the assistance data indicates that a PRU is a physical PRU, the UE may know that it is able to establish a SL/Uu connection with the PRU to offload the communication traffic.

Figure 15:
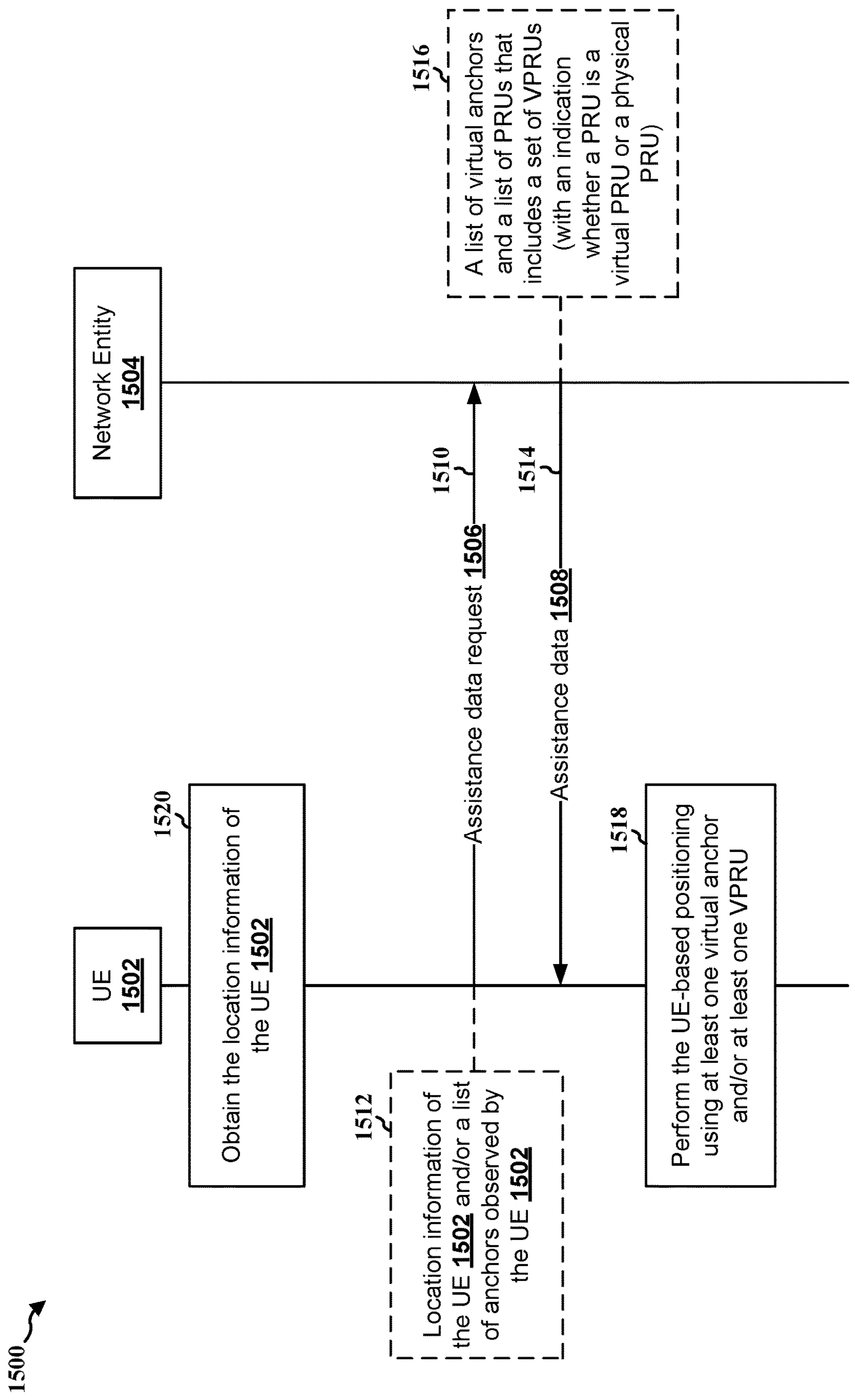
FIG. 15 is a communication flow illustrating an example of information that may be included in an assistance data request and the assistance data which may enable a network entity to configure virtual anchors and/or VPRUs for a UE more efficiently in accordance with various aspects of the present disclosure.

FIG. 15 is a communication flow 1500 illustrating an example of information that may be included in an assistance data request and the assistance data which may enable a network entity to configure virtual anchors and/or VPRUs for a UE more efficiently in accordance with various aspects of the present disclosure. The numberings associated with the communication flow 1500 do not specify a particular temporal order and are merely used as references for the communication flow 1500.

At 1510, a UE 1502 may transmit an assistance data request 1506 to a network entity 1504 (e.g., a location server, an LMF, etc.) for performing UE-based positioning. As shown at 1512, assistance data request 1506 may include location information of the UE 1502 and/or a list of anchors observed by the UE 1502. The UE-based positioning may be associated with at least one difference-based positioning method.

In one example, as shown at 1520, prior to transmit the assistance data request 1506, the UE 1502 may obtain its location information. For example, the UE 1502 may estimate its location based on a serving ID associated with the UE 1502, a serving beam ID associated with the UE 1502, an ECID associated with the UE 1502, a previous location estimate of the UE 1502, a SL zone ID associated with the UE 1502, and/or a RAN-independent location estimate of the UE 1502, etc.

At 1514, based on the assistance data request 1506, the network entity 1504 may generate and transmit assistance data 1508 to the UE 1502 for the UE-based positioning. As shown at 1516, the assistance data 1508 may include a list of virtual anchors and a list of PRUs, which may include a set of VPRUs. The network entity 1504 may select the list of virtual anchors and the list of PRUs based on the location information of the UE 1502 or/or the list of anchors observed by the UE 1502.

In one example, as shown at 1516, the assistance data 1508 may further include an indication of whether each PRU in the list of PRUs is a physical PRU or a VPRU. Based on the indication, the UE 1502 may refrain from establishing a direct connection with a PRU in the list of PRUs if the PRU is indicated as the VPRU, or the UE may enable a direct connection to be established with a PRU in the list of PRUs if the PRU is indicated as the physical PRU.

In another example, the list of virtual anchors may be associated with at least one group ID, such as a virtual anchor group ID. In one example, the network entity 1404 may generate anchor group information that includes a set of associations between different groups of virtual anchors and their corresponding group IDs, and the network entity 1404 may transmit the anchor group information for one or more network nodes (e.g., network nodes that are capable of supporting at least one difference-based positioning method using at least one VPRU). In another example, the network entity 1404 may also transmit (e.g., to a base station) the at least one group ID in response to the UE being handed over to the base station.

As discussed in connection with FIGS. 8-11, each virtual anchor in the list of virtual anchors may correspond to a physical anchor with a location/vector offset, and each VPRU in the set of VPRUs may be generated based on at least one physical PRU (each VPRU in the set of VPRUs is also associated with a virtual location).

At 1518, the UE 1502 may perform the UE-based positioning using at least one virtual anchor and at least one VPRU in the assistance data 1508, such as described in connection with FIGS. 9, 10, 13, and 14. In some examples, the UE 1502 may also receive a set of measurements or correction data from the network entity 1504 for the set of VPRUs based on a virtual location for each VPRU in the set of VPRUs and the list of virtual anchors, such as described in connection with 1436 and 1438 of FIG. 14.

Figure 16:
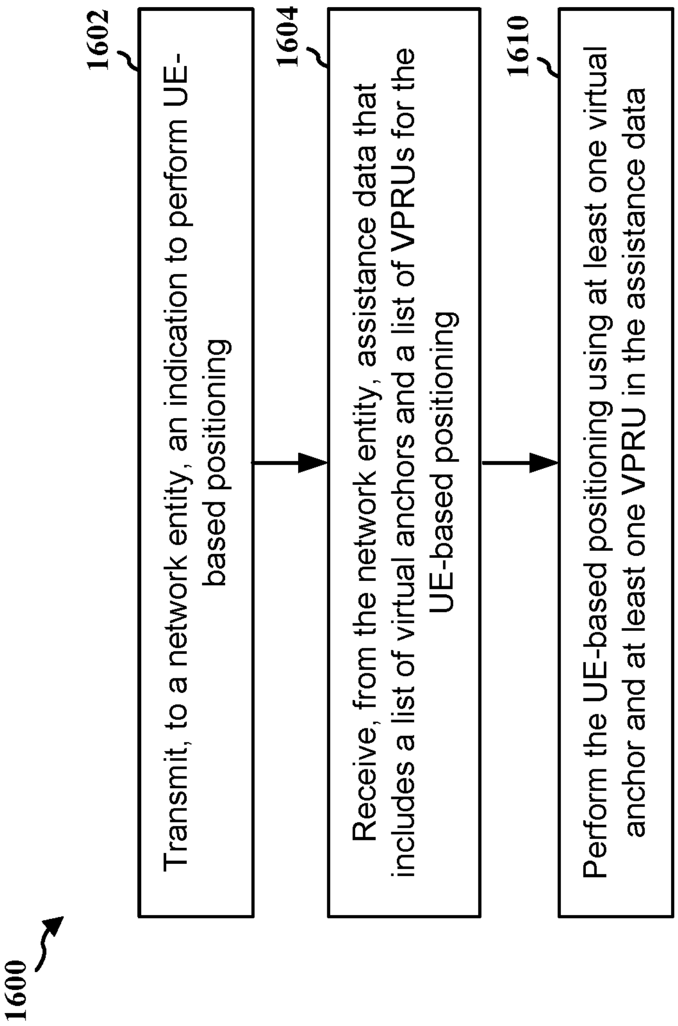
FIG. 16 is a flowchart of a method of wireless communication.

FIG. 16 is a flowchart 1600 of a method of wireless communication. The method may be performed by a UE (e.g., the UE 104, 404, 702, 920, 1302, 1402, 1502; the GNSS device 506; the rover device 604; the apparatus 1804). The method may enable the UE to perform UE-based positioning with virtual anchors and/or virtual PRUs.

At 1602, the UE may transmit, to a network entity, an indication to perform UE-based positioning, such as described in connection with FIG. 14. For example, as shown at 1420 of FIG. 14, the UE 1402 may transmit an indication to perform UE-based positioning to the network entity 1404. The means for transmitting the indication may be performed by, e.g., the positioning component 198, the application processor 1806, the cellular baseband processor 1824, and/or the transceiver(s) 1822 of the apparatus 1804 in FIG. 18.

In one example, the UE-based positioning may be associated with at least one difference-based positioning method.

At 1604, the UE may receive, from the network entity, assistance data that includes a list of virtual anchors and a list of VPRUs for the UE-based positioning, such as described in connection with FIGS. 14 and 15. For example, as shown at 1420 of FIG. 14, the UE 1402 may receive the assistance data 1406 from the network entity 1404, where the assistance data 1406 may include a list of virtual anchors 1408 and a list of VPRUs 1410 for the UE-based positioning. The means for receiving the assistance data may be performed by, e.g., the positioning component 198, the application processor 1806, the cellular baseband processor 1824, and/or the transceiver(s) 1822 of the apparatus 1804 in FIG. 18.

In one example, each virtual anchor in the list of virtual anchors may correspond to a physical anchor with a location/vector offset.

In another example, each VPRU in the list of VPRUs is generated based on at least one physical positioning reference unit (PPRU), where each VPRU in the list of VPRUs may be associated with a corresponding virtual location in a set of virtual locations.

At 1610, the UE may perform the UE-based positioning using at least one virtual anchor and at least one VPRU in the assistance data, such as described in connection with FIG. 14. For example, as shown at 1426 of FIG. 14, the UE 1402 may perform the UE-based positioning using at least one virtual anchor and/or at least one VPRU. The means for performing the UE-based positioning may be performed by, e.g., the positioning component 198, the application processor 1806, the cellular baseband processor 1824, and/or the transceiver(s) 1822 of the apparatus 1804 in FIG. 18.

In one example, the UE may transmit, to the network entity, a request for using a suitable or favored VPRU, and receive the assistance data that includes the suitable or favored VPRUs in the list of VPRUs based on the request, such as described in connection with FIG. 14. For example, as shown at 1432 of FIG. 14, the UE 1402 may transmit an indication of a suitable or favored VPRU to the network entity 1404, and the network entity 1404 may include the suitable or favored VPRU in the assistance data 1406. The means for transmitting the request and/or the means for receiving the assistance data may be performed by, e.g., the positioning component 198, the application processor 1806, the cellular baseband processor 1824, and/or the transceiver (s) 1822 of the apparatus 1804 in FIG. 18.

In another example, the UE may receive, from the network entity, a set of measurements or correction data for the list of VPRUs based on a virtual location for each VPRU in the list of VPRUs and the list of virtual anchors, such as described in connection with FIG. 14. For example, as shown at 1438 of FIG. 14, the UE 1402 may receive a set of measurements or correction data for the VPRU 1412 from the network entity 1404. The means for transmitting the indication may be performed by, e.g., the positioning component 198, the application processor 1806, the cellular baseband processor 1824, and/or the transceiver(s) 1822 of the apparatus 1804 in FIG. 18. In one example, The UE may perform the UE-based positioning further based on the set of measurements or correction data.

Figure 17:
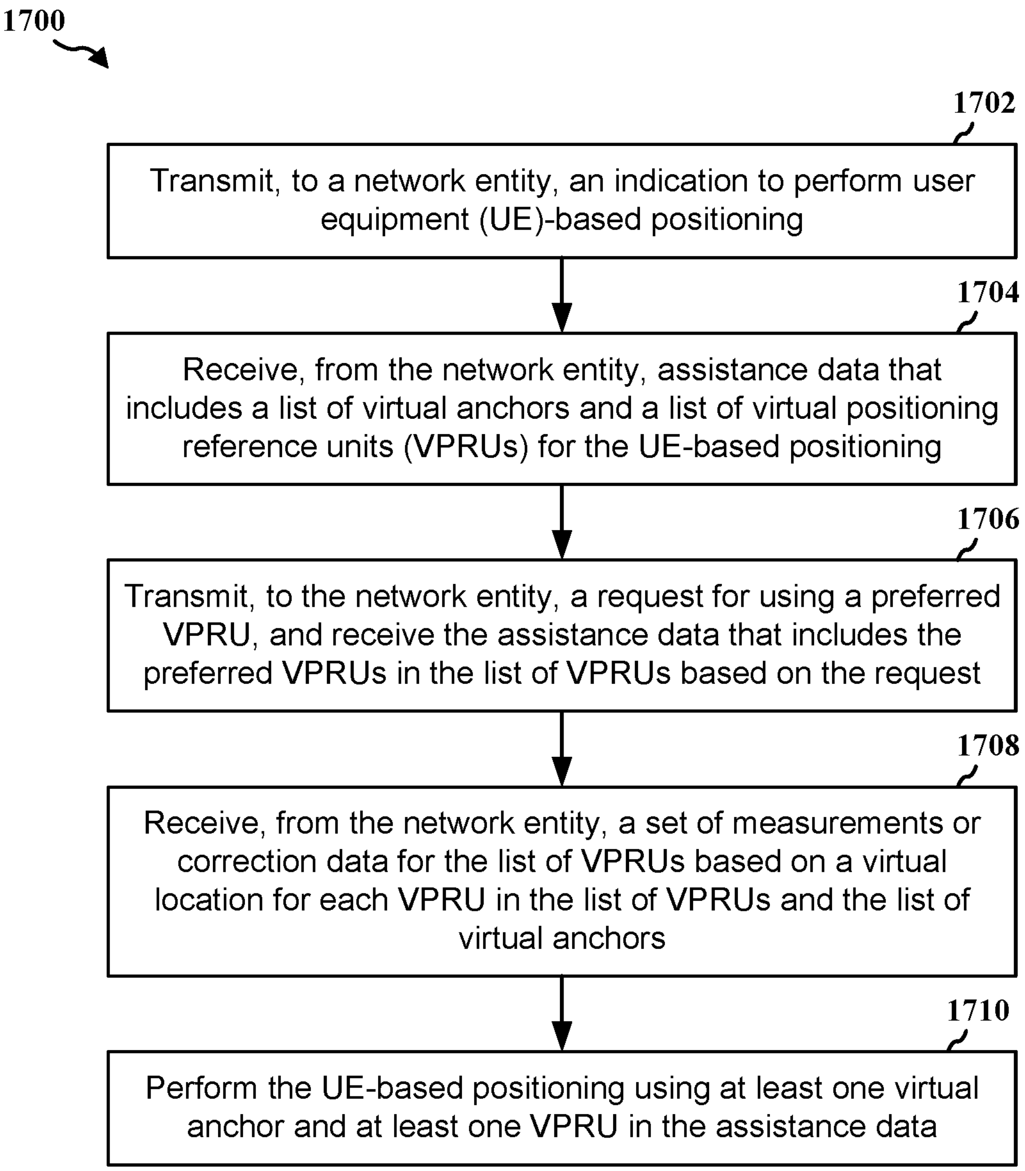
FIG. 17 is a flowchart of a method of wireless communication.

FIG. 17 is a flowchart 1700 of a method of wireless communication. The method may be performed by a UE (e.g., the UE 104, 404, 702, 920, 1302, 1402, 1502; the GNSS device 506; the rover device 604; the apparatus 1804). The method may enable the UE to perform UE-based positioning with virtual anchors and/or virtual PRUs.

At 1702, the UE may transmit, to a network entity, an indication to perform UE-based positioning, such as described in connection with FIG. 14. For example, as shown at 1420 of FIG. 14, the UE 1402 may transmit an indication to perform UE-based positioning to the network entity 1404. The means for transmitting the indication may be performed by, e.g., the positioning component 198, the application processor 1806, the cellular baseband processor 1824, and/or the transceiver(s) 1822 of the apparatus 1804 in FIG. 18.

In one example, the UE-based positioning may be associated with at least one difference-based positioning method.

At 1704, the UE may receive, from the network entity, assistance data that includes a list of virtual anchors and a list of VPRUs for the UE-based positioning, such as described in connection with FIGS. 14 and 15. For example, as shown at 1420 of FIG. 14, the UE 1402 may receive the assistance data 1406 from the network entity 1404, where the assistance data 1406 may include a list of virtual anchors 1408 and a list of VPRUs 1410 for the UE-based positioning. The means for receiving the assistance data may be performed by, e.g., the positioning component 198, the application processor 1806, the cellular baseband processor 1824, and/or the transceiver(s) 1822 of the apparatus 1804 in FIG. 18.

In one example, each virtual anchor in the list of virtual anchors may correspond to a physical anchor with a location/vector offset.

In another example, each VPRU in the list of VPRUs is generated based on at least one physical positioning reference unit (PPRU), where each VPRU in the list of VPRUs may be associated with a corresponding virtual location in a set of virtual locations.

At 1710, the UE may perform the UE-based positioning using at least one virtual anchor and at least one VPRU in the assistance data, such as described in connection with FIG. 14. For example, as shown at 1426 of FIG. 14, the UE 1402 may perform the UE-based positioning using at least one virtual anchor and/or at least one VPRU. The means for performing the UE-based positioning may be performed by, e.g., the positioning component 198, the application processor 1806, the cellular baseband processor 1824, and/or the transceiver(s) 1822 of the apparatus 1804 in FIG. 18.

In one example, at 1706, the UE may transmit, to the network entity, a request for using a suitable VPRU or a favored VPRU, and receive the assistance data that includes the suitable or favored VPRUs in the list of VPRUs based on the request, such as described in connection with FIG. 14. For example, as shown at 1432 of FIG. 14, the UE 1402 may transmit an indication of a suitable or favored VPRU to the network entity 1404, and the network entity 1404 may include the suitable or favored VPRU in the assistance data 1406. The means for transmitting the request and/or the means for receiving the assistance data may be performed by, e.g., the positioning component 198, the application processor 1806, the cellular baseband processor 1824, and/or the transceiver(s) 1822 of the apparatus 1804 in FIG. 18.

In another example, at 1708, the UE may receive, from the network entity, a set of measurements or correction data for the list of VPRUs based on a virtual location for each VPRU in the list of VPRUs and the list of virtual anchors, such as described in connection with FIG. 14. For example, as shown at 1438 of FIG. 14, the UE 1402 may receive a set of measurements or correction data for the VPRU 1412 from the network entity 1404. The means for transmitting the indication may be performed by, e.g., the positioning component 198, the application processor 1806, the cellular baseband processor 1824, and/or the transceiver(s) 1822 of the apparatus 1804 in FIG. 18. In one example, The UE may perform the UE-based positioning further based on the set of measurements or correction data.

Figure 18:
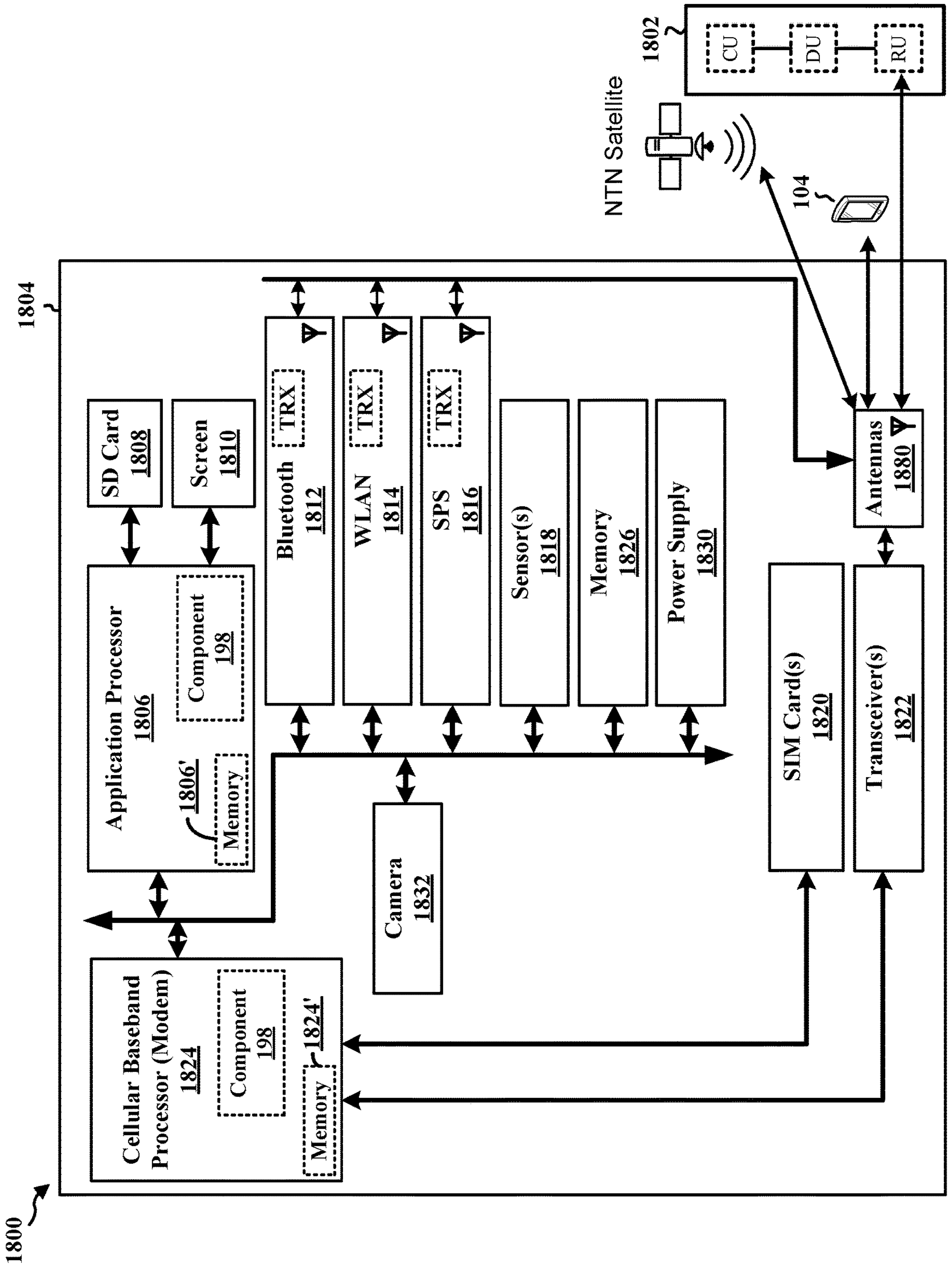
FIG. 18 is a diagram illustrating an example of a hardware implementation for an example apparatus and/or network entity.

FIG. 18 is a diagram 1800 illustrating an example of a hardware implementation for an apparatus 1804. The apparatus 1804 may be a UE, a component of a UE, or may implement UE functionality. In some aspects, the apparatus 1804 may include a cellular baseband processor 1824 (also referred to as a modem) coupled to one or more transceivers 1822 (e.g., cellular RF transceiver). The cellular baseband processor 1824 may include on-chip memory 1824'. In some aspects, the apparatus 1804 may further include one or more subscriber identity modules (SIM) cards 1820 and an application processor 1806 coupled to a secure digital (SD) card 1808 and a screen 1810. The application processor 1806 may include on-chip memory 1806'. In some aspects, the apparatus 1804 may further include a Bluetooth module 1812, a WLAN module 1814, an SPS module 1816 (e.g., GNSS module), one or more sensor modules 1818 (e.g., barometric pressure sensor/altimeter; motion sensor such as inertial measurement unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 1826, a power supply 1830, and/or a camera 1832. The Bluetooth module 1812, the WLAN module 1814, and the SPS module 1816 may include an on-chip transceiver (TRX) (or in some cases, just a receiver (RX)). The Bluetooth module 1812, the WLAN module 1814, and the SPS module 1816 may include their own dedicated antennas and/or utilize the antennas 1880 for communication. The cellular baseband processor 1824 communicates through the transceiver(s) 1822 via one or more antennas 1880 with the UE 104 and/or with an RU associated with a network entity 1802. The cellular baseband processor 1824 and the application processor 1806 may each include a computer-readable medium/memory 1824', 1806', respectively. The additional memory modules 1826 may also be considered a computer-readable medium/memory. Each computer-readable medium/memory 1824', 1806', 1826 may be non-transitory. The cellular baseband processor 1824 and the application processor 1806 are each responsible for general processing, including the execution of software stored on the computer-readable medium/memory. The software, when executed by the cellular baseband processor 1824/application processor 1806, causes the cellular baseband processor 1824/application processor 1806 to perform the various functions described supra. The computer-readable medium/memory may also be used for storing data that is manipulated by the cellular baseband processor 1824/application processor 1806 when executing software. The cellular baseband processor 1824/application processor 1806 may be a component of the UE 350 and may include the memory 360 and/or at least one of the TX processor 368, the RX processor 356, and the controller/processor 359. In one configuration, the apparatus 1804 may be a processor chip (modem and/or application) and include just the cellular baseband processor 1824 and/or the application processor 1806, and in another configuration, the apparatus 1804 may be the entire UE (e.g., see UE 350 of FIG. 3) and include the additional modules of the apparatus 1804.

As discussed supra, the positioning component 198 may be configured to transmit, to a network entity, an indication to perform UE-based positioning. The positioning component 198 may also be configured to receive, from the network entity, assistance data that includes a list of virtual anchors and a list of VPRUs for the UE-based positioning. The positioning component 198 may also be configured to perform the UE-based positioning using at least one virtual anchor and at least one VPRU in the assistance data. The positioning component 198 may be within the cellular baseband processor 1824, the application processor 1806, or both the cellular baseband processor 1824 and the application processor 1806. The positioning component 198 may be one or more hardware components specifically configured to carry out the stated processes/algorithm, implemented by one or more processors configured to perform the stated processes/algorithm, stored within a computer-readable medium for implementation by one or more processors, or some combination thereof. As shown, the apparatus 1804 may include a variety of components configured for various functions. In one configuration, the apparatus 1804, and in particular the cellular baseband processor 1824 and/or the application processor 1806, may include means for transmitting, to a network entity, an indication to perform UE-based positioning. The apparatus 1804 may further include means for receiving, from the network entity, assistance data that includes a list of virtual anchors and a list of VPRUs for the UE-based positioning. The apparatus 1804 may further include means for performing the UE-based positioning using at least one virtual anchor and at least one VPRU in the assistance data.

In one configuration, the UE-based positioning may be associated with at least one difference-based positioning method.

In another configuration, each virtual anchor in the list of virtual anchors may correspond to a physical anchor with a location/vector offset.

In another configuration, each VPRU in the list of VPRUs is generated based on at least one PPRU, where each VPRU in the list of VPRUs may be associated with a corresponding virtual location in a set of virtual locations.

In another configuration, the apparatus 1804 may further include means for transmitting, to the network entity, a request for using a suitable or favored VPRU, and means for receiving the assistance data that includes the suitable or favored VPRUs in the list of VPRUs based on the request.

In another configuration, the apparatus 1804 may further include means for receiving, from the network entity, a set of measurements or correction data for the list of VPRUs based on a virtual location for each VPRU in the list of VPRUs and the list of virtual anchors. In some implementations, the apparatus 1804 may further include means for performing the UE-based positioning further based on the set of measurements or correction data.

The means may be the positioning component 198 of the apparatus 1804 configured to perform the functions recited by the means. As described supra, the apparatus 1804 may include the TX processor 368, the RX processor 356, and the controller/processor 359. As such, in one configuration, the means may be the TX processor 368, the RX processor 356, and/or the controller/processor 359 configured to perform the functions recited by the means.

Figure 19:
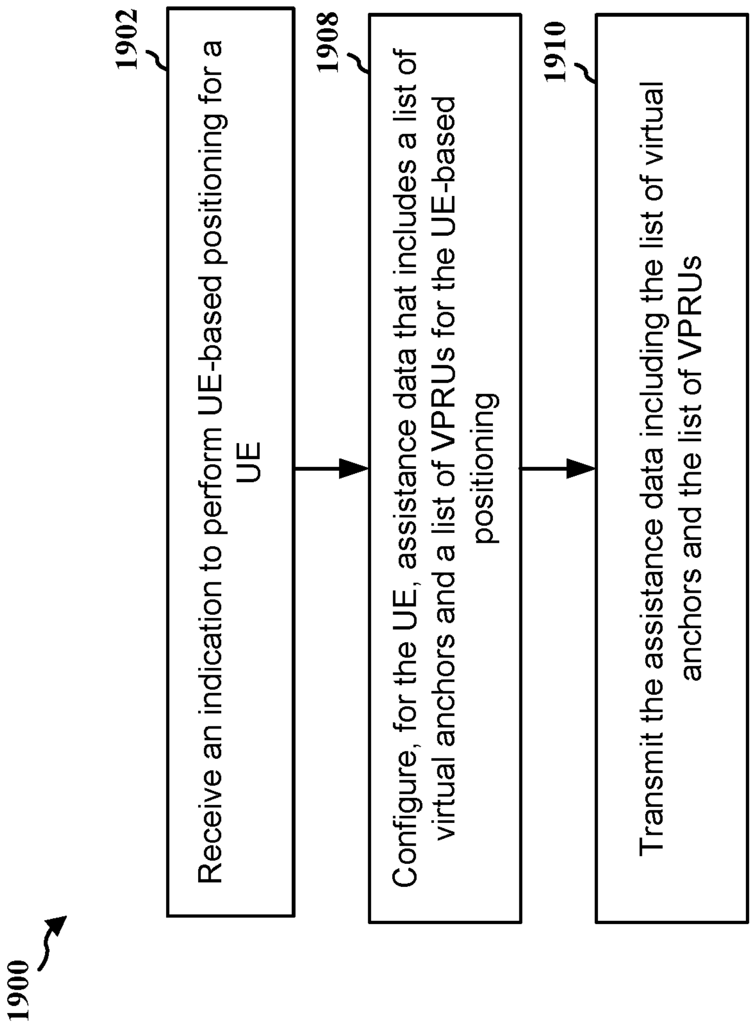
FIG. 19 is a flowchart of a method of wireless communication.

FIG. 19 is a flowchart 1900 of a method of wireless communication. The method may be performed by a network entity (e.g., the base station 102; the server 918; the network entity 1304, 1404, 1504, 2102). The method may enable the network entity to generate and configure virtual anchors and/or VPRUs for a UE for UE-based positioning.

At 1902, the network entity may receive an indication to perform UE-based positioning for a UE, such as described in connection with FIG. 14. For example, as shown at 1420 of FIG. 14, the network entity 1404 may receive an indication to perform UE-based positioning from the UE 1402. The means for receiving the indication may be performed by, e.g., the virtual anchor and reference station configuration component 199, the RU processor 2142, and/or the transceiver(s) 2146 of the network entity 2102 in FIG. 21.

In one example, the UE-based positioning may be associated with at least one difference-based positioning method.

At 1908, the network entity may configure, for the UE, assistance data that includes a list of virtual anchors and a list of VPRUs for the UE-based positioning, such as described in connection with FIG. 14. For example, as shown at 1422 of FIG. 14, the network entity 1404 may configure assistance data 1406 for the UE 1402, where the assistance data 1406 includes a list of virtual anchors 1408 and a list of VPRUs 1410 for the UE-based positioning. The means for configuring the assistance data may be performed by, e.g., the virtual anchor and reference station configuration component 199, the RU processor 2142, and/or the transceiver(s) 2146 of the network entity 2102 in FIG. 21.

At 1910, the network entity may transmit, to the UE, the assistance data including the list of virtual anchors and the list of VPRUs, such as described in connection with FIG. 14. For example, as shown at 1424 of FIG. 14, the network entity 1404 may transmit the assistance data 1406 that includes the list of virtual anchors 1408 and the list of VPRUs 1410 to the UE 1402. The means for transmitting the assistance data may be performed by, e.g., the virtual anchor and reference station configuration component 199, the RU processor 2142, and/or the transceiver(s) 2146 of the network entity 2102 in FIG. 21.

In one example, the network entity may generate the list of virtual anchors based on a location/vector offset to each physical anchor in a set of physical anchors, such as described in connection with FIGS. 8 and 14. For example, as shown at 1428 of FIG. 14, the network entity 1404 may generate the list of virtual anchors 1408 based on a location/vector offset to each physical anchor in a set of physical anchors. The means for may generating the list of virtual anchors may be performed by, e.g., the virtual anchor and reference station configuration component 199, the RU processor 2142, and/or the transceiver(s) 2146 of the network entity 2102 in FIG. 21.

In another example, the network entity may generate the list of VPRUs based on at least one physical positioning reference unit, where each VPRU in the list of VPRUs may be associated with a corresponding virtual location in a set of virtual locations, such as described in connection with FIGS. 9-11, and 14. For example, as shown at 1430 of FIG. 14, the network entity 1404 may generate the list of VPRUs 1410 based on at least one physical PRU, where each VPRU may be associated with a corresponding virtual location. The means for generating the list of VPRUs may be performed by, e.g., the virtual anchor and reference station configuration component 199, the RU processor 2142, and/or the transceiver(s) 2146 of the network entity 2102 in FIG. 21.

In another example, the network entity may select the list of VPRUs for the UE-based positioning based on the corresponding virtual location of each VPRU and an estimated location of the UE. In some implementations, a ratio between a first approximate distance from the estimated location of the UE to the list of virtual anchors and a second approximate distance from the estimated location of the UE to the list of VPRUs may exceed a ratio threshold.

In another example, the corresponding virtual location for each VPRU in the list of VPRUs may be pre-assigned or pre-configured. In some implementations, the virtual location for each VPRU may correspond to a cross point of a grid covering a specific area.

In another example, the network entity may receive, from the UE, a request for using a suitable or favored VPRU, and the network entity may configure the assistance data to include the suitable or favored VPRU in the list of VPRUs based on the request.

In another example, the corresponding virtual location for each VPRU in the list of VPRUs may be generated based on an estimated location of the UE. In some implementations, the network entity may determine the estimated location of the UE based on at least one of: a serving cell ID associated with the UE, a serving beam ID associated with the UE, an ECID associated with the UE, a previous location estimate of the UE, a location reported by the UE, a SL zone ID associated with the UE, or a RAN-independent location estimate of the UE.

In another example, the network entity may generate a set of measurements or correction data for the list of VPRUs based on a virtual location for each VPRU in the list of VPRUs and the list of virtual anchors, and the network entity may transmit, to the UE, the set of measurements or the correction data for the UE-based positioning, such as described in connection with FIGS. 13 and 14. For example, as shown at 1436 of FIG. 14, the network entity 1404 may generate a set of measurements or correction data for the VPRU 1412 based on the virtual location of the VPRU 1412 and the virtual locations of one or more virtual anchors. The means for generating a set of measurements or correction data may be performed by, e.g., the virtual anchor and reference station configuration component 199, the RU processor 2142, and/or the transceiver(s) 2146 of the network entity 2102 in FIG. 21.

In one example, the set of measurements or the correction data may be further generated based on one or more error sources including at least one of: an anchor clock bias, a group delay, an atmospheric effect or delay, a non-line-of-sight (NLOS) effect, or at least one environmental effect. In some implementations, the network entity may estimate or track the one or more error sources based on raw measurements received from a set of physical PRUs. In some implementations, the network entity may broadcast the one or more error sources based on an OSR format or an SSR format.

Figure 20:
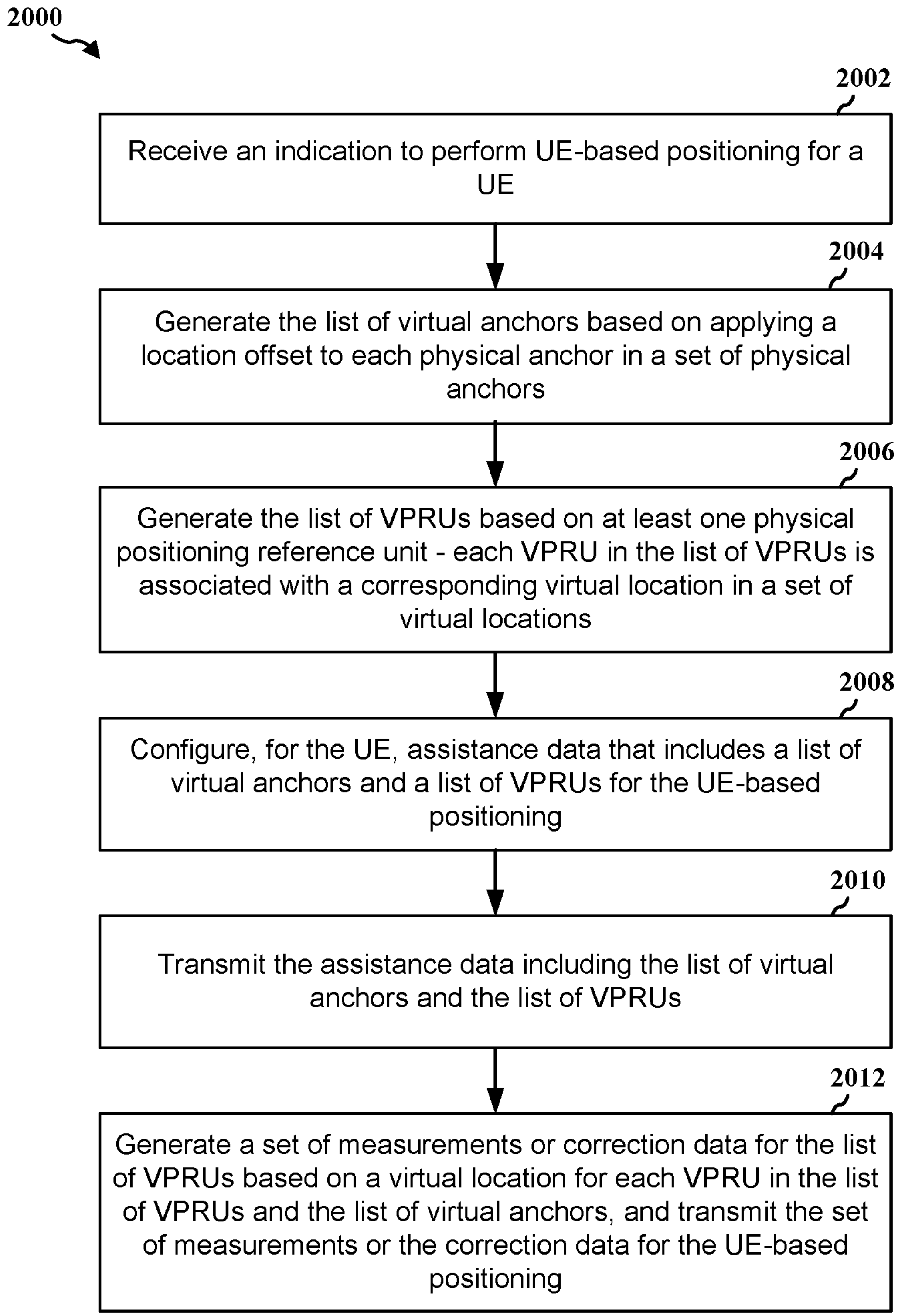
FIG. 20 is a flowchart of a method of wireless communication.

FIG. 20 is a flowchart 2000 of a method of wireless communication. The method may be performed by a network entity (e.g., the base station 102; the server 918; the network entity 1304, 1404, 1504, 2102). The method may enable the network entity to generate and configure virtual anchors and/or VPRUs for a UE for UE-based positioning.

At 2002, the network entity may receive an indication to perform UE-based positioning for a UE, such as described in connection with FIG. 14. For example, as shown at 1420 of FIG. 14, the network entity 1404 may receive an indication to perform UE-based positioning from the UE 1402. The means for receiving the indication may be performed by, e.g., the virtual anchor and reference station configuration component 199, the RU processor 2142, and/or the transceiver(s) 2146 of the network entity 2102 in FIG. 21.

In one example, the UE-based positioning may be associated with at least one difference-based positioning method.

At 2008, the network entity may configure, for the UE, assistance data that includes a list of virtual anchors and a list of VPRUs for the UE-based positioning, such as described in connection with FIG. 14. For example, as shown at 1422 of FIG. 14, the network entity 1404 may configure assistance data 1406 for the UE 1402, where the assistance data 1406 includes a list of virtual anchors 1408 and a list of VPRUs 1410 for the UE-based positioning. The means for configuring the assistance data may be performed by, e.g., the virtual anchor and reference station configuration component 199, the RU processor 2142, and/or the transceiver(s) 2146 of the network entity 2102 in FIG. 21.

At 2010, the network entity may transmit, to the UE, the assistance data including the list of virtual anchors and the list of VPRUs, such as described in connection with FIG. 14. For example, as shown at 1424 of FIG. 14, the network entity 1404 may transmit the assistance data 1406 that includes the list of virtual anchors 1408 and the list of VPRUs 1410 to the UE 1402. The means for transmitting the assistance data may be performed by, e.g., the virtual anchor and reference station configuration component 199, the RU processor 2142, and/or the transceiver(s) 2146 of the network entity 2102 in FIG. 21.

In one example, at 2004, the network entity may generate the list of virtual anchors based on a location/vector offset to each physical anchor in a set of physical anchors, such as described in connection with FIGS. 8 and 14. For example, as shown at 1428 of FIG. 14, the network entity 1404 may generate the list of virtual anchors 1408 based on a location/vector offset to each physical anchor in a set of physical anchors. The means for may generating the list of virtual anchors may be performed by, e.g., the virtual anchor and reference station configuration component 199, the RU processor 2142, and/or the transceiver(s) 2146 of the network entity 2102 in FIG. 21.

In another example, at 2006, the network entity may generate the list of VPRUs based on at least one physical positioning reference unit, where each VPRU in the list of VPRUs may be associated with a corresponding virtual location in a set of virtual locations, such as described in connection with FIGS. 9-11, and 14. For example, as shown at 1430 of FIG. 14, the network entity 1404 may generate the list of VPRUs 1410 based on at least one physical PRU, where each VPRU may be associated with a corresponding virtual location. The means for generating the list of VPRUs may be performed by, e.g., the virtual anchor and reference station configuration component 199, the RU processor 2142, and/or the transceiver(s) 2146 of the network entity 2102 in FIG. 21.

In one example, the network entity may select the list of VPRUs for the UE-based positioning based on the corresponding virtual location of each VPRU and an estimated location of the UE. In some implementations, a ratio between a first approximate distance from the estimated location of the UE to the list of virtual anchors and a second approximate distance from the estimated location of the UE to the list of VPRUs may exceed a ratio threshold.

In another example, the corresponding virtual location for each VPRU in the list of VPRUs may be pre-assigned or pre-configured. In some implementations, the virtual location for each VPRU may correspond to a cross point of a grid covering a specific area.

In another example, the network entity may receive, from the UE, a request for using a suitable or favored VPRU, and the network entity may configure the assistance data to include the suitable or favored VPRU in the list of VPRUs based on the request.

In another example, the corresponding virtual location for each VPRU in the list of VPRUs may be generated based on an estimated location of the UE. In some implementations, the network entity may determine the estimated location of the UE based on at least one of: a serving cell ID associated with the UE, a serving beam ID associated with the UE, an ECID associated with the UE, a previous location estimate of the UE, a location reported by the UE, a SL zone ID associated with the UE, or a RAN-independent location estimate of the UE.

In another example, at 2012, the network entity may generate a set of measurements or correction data for the list of VPRUs based on a virtual location for each VPRU in the list of VPRUs and the list of virtual anchors, and the network entity may transmit, to the UE, the set of measurements or the correction data for the UE-based positioning, such as described in connection with FIGS. 13 and 14. For example, as shown at 1436 of FIG. 14, the network entity 1404 may generate a set of measurements or correction data for the VPRU 1412 based on the virtual location of the VPRU 1412 and the virtual locations of one or more virtual anchors. The means for generating a set of measurements or correction data may be performed by, e.g., the virtual anchor and reference station configuration component 199, the RU processor 2142, and/or the transceiver(s) 2146 of the network entity 2102 in FIG. 21.

In one example, the set of measurements or the correction data may be further generated based on one or more error sources including at least one of: an anchor clock bias, a group delay, an atmospheric effect or delay, a non-line-of-sight (NLOS) effect, or at least one environmental effect. In some implementations, the network entity may estimate or track the one or more error sources based on raw measurements received from a set of physical PRUs. In some implementations, the network entity may broadcast the one or more error sources based on an observation space representation (OSR) format or a state space representation (SSR) format.

Figure 21:
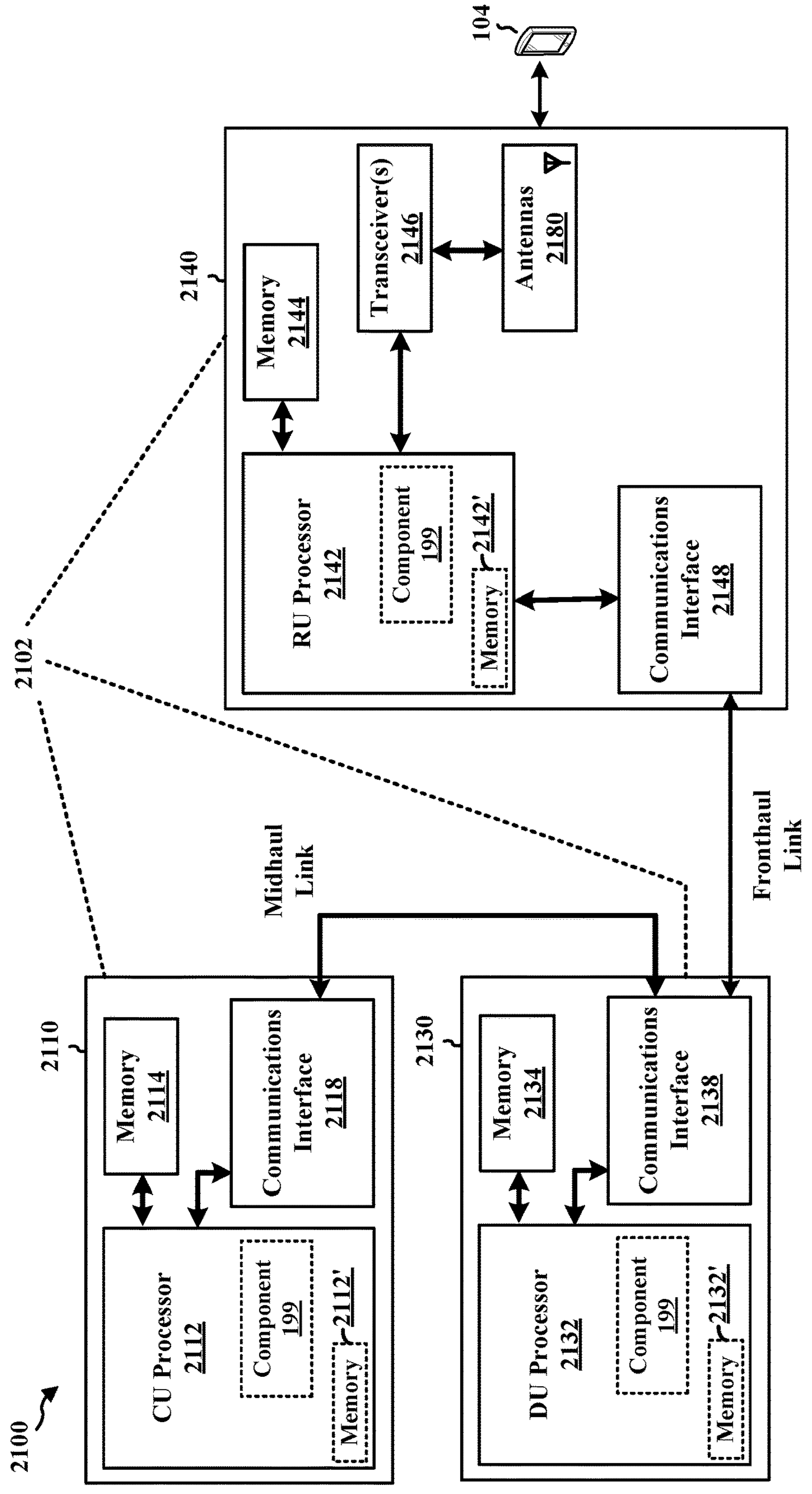
FIG. 21 is a diagram illustrating an example of a hardware implementation for an example network entity.

FIG. 21 is a diagram 2100 illustrating an example of a hardware implementation for a network entity 2102. The network entity 2102 may be a BS, a component of a BS, or may implement BS functionality. The network entity 2102 may include at least one of a CU 2110, a DU 2130, or an RU 2140. For example, depending on the layer functionality handled by the virtual anchor and reference station configuration component 199, the network entity 2102 may include the CU 2110; both the CU 2110 and the DU 2130; each of the CU 2110, the DU 2130, and the RU 2140; the DU 2130; both the DU 2130 and the RU 2140; or the RU 2140. The CU 2110 may include a CU processor 2112. The CU processor 2112 may include on-chip memory 2112'. In some aspects, the CU 2110 may further include additional memory modules 2114 and a communications interface 2118. The CU 2110 communicates with the DU 2130 through a midhaul link, such as an F1 interface. The DU 2130 may include a DU processor 2132. The DU processor 2132 may include on-chip memory 2132'. In some aspects, the DU 2130 may further include additional memory modules 2134 and a communications interface 2138. The DU 2130 communicates with the RU 2140 through a fronthaul link. The RU 2140 may include an RU processor 2142. The RU processor 2142 may include on-chip memory 2142'. In some aspects, the RU 2140 may further include additional memory modules 2144, one or more transceivers 2146, antennas 2180, and a communications interface 2148. The RU 2140 communicates with the UE 104. The on-chip memory 2112', 2132', 2142' and the additional memory modules 2114, 2134, 2144 may each be considered a computer-readable medium/memory. Each computer-readable medium/memory may be non-transitory. Each of the processors 2112, 2132, 2142 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the virtual anchor and reference station configuration component 199 may be configured to receive an indication to perform UE-based positioning for a UE. The virtual anchor and reference station configuration component 199 may also be configured to configure, for the UE, assistance data that includes a list of virtual anchors and a list of VPRUs for the UE-based positioning. The virtual anchor and reference station configuration component 199 may also be configured to transmit, to the UE, the assistance data including the list of virtual anchors and the list of VPRUs. The virtual anchor and reference station configuration component 199 may be within one or more processors of one or more of the CU 2110, DU 2130, and the RU 2140. The virtual anchor and reference station configuration component 199 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 2102 may include a variety of components configured for various functions. In one configuration, the network entity 2102 may include means for receiving an indication to perform UE-based positioning for a UE. The network entity 2102 may further include means for configuring, for the UE, assistance data that includes a list of virtual anchors and a list of VPRUs for the UE-based positioning. The network entity 2102 may further include means for transmitting, to the UE, the assistance data including the list of virtual anchors and the list of VPRUs.

In one configuration, the UE-based positioning may be associated with at least one difference-based positioning method.

In another configuration, the network entity 2102 may further include means for generating the list of virtual anchors based on a location/vector offset to each physical anchor in a set of physical anchors.

In another configuration, the network entity 2102 may further include means for generating the list of VPRUs based on at least one physical positioning reference unit, where each VPRU in the list of VPRUs may be associated with a corresponding virtual location in a set of virtual locations.

In another configuration, the network entity 2102 may further include means for selecting the list of VPRUs for the UE-based positioning based on the corresponding virtual location of each VPRU and an estimated location of the UE. In some implementations, a ratio between a first approximate distance from the estimated location of the UE to the list of virtual anchors and a second approximate distance from the estimated location of the UE to the list of VPRUs may exceed a ratio threshold.

In another configuration, the corresponding virtual location for each VPRU in the list of VPRUs may be pre-assigned or pre-configured. In some implementations, the virtual location for each VPRU may correspond to a cross point of a grid covering a specific area.

In another configuration, the network entity 2102 may further include means for receiving, from the UE, a request for using a suitable or favored VPRU, and means for configuring the assistance data to include the suitable or favored VPRU in the list of VPRUs based on the request.

In another configuration, the corresponding virtual location for each VPRU in the list of VPRUs may be generated based on an estimated location of the UE. In some implementations, the network entity 2102 may further include means for determining the estimated location of the UE based on at least one of: a serving cell ID associated with the UE, a serving beam ID associated with the UE, an ECID associated with the UE, a previous location estimate of the UE, a location reported by the UE, a SL zone ID associated with the UE, or a RAN-independent location estimate of the UE.

In another configuration, the network entity 2102 may further include means for generating a set of measurements or correction data for the list of VPRUs based on a virtual location for each VPRU in the list of VPRUs and the list of virtual anchors, and means for transmitting, to the UE, the set of measurements or the correction data for the UE-based positioning.

In another configuration, the set of measurements or the correction data may be further generated based on one or more error sources including at least one of: an anchor clock bias, a group delay, an atmospheric effect or delay, a NLOS effect, or at least one environmental effect. In some implementations, the network entity 2102 may further include means for estimating or tracking the one or more error sources based on raw measurements received from a set of physical PRUs. In some implementations, the network entity 2102 may further include means for broadcasting the one or more error sources based on an OSR format or an SSR format.

The means may be the virtual anchor and reference station configuration component 199 of the network entity 2102 configured to perform the functions recited by the means. As described supra, the network entity 2102 may include the TX processor 316, the RX processor 370, and the controller/processor 375. As such, in one configuration, the means may be the TX processor 316, the RX processor 370, and/or the controller/processor 375 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean “one and only one” unless specifically so stated, but rather “one or more.” Terms such as “if,” “when,” and “while” do not imply an immediate temporal relationship or reaction. That is, these phrases, e.g., “when,” do not imply an immediate action in response to or during the occurrence of an action, but simply imply that if a condition is met then an action will occur, but without requiring a specific or immediate time constraint for the action to occur. The word “exemplary” is used herein to mean “serving as an example, instance, or illustration.” Any aspect described herein as “exemplary” is not necessarily to be construed as preferred or advantageous over other aspects. Unless specifically stated otherwise, the term “some” refers to one or more. Combinations such as “at least one of A, B, or C,” “one or more of A, B, or C,” “at least one of A, B, and C,” “one or more of A, B, and C,” and “A, B, C, or any combination thereof” include any combination of A, B, and/or C, and may include multiples of A, multiples of B, or multiples of C. Specifically, combinations such as “at least one of A, B, or C,” “one or more of A, B, or C,” “at least one of A, B, and C,” “one or more of A, B, and C,” and “A, B, C, or any combination thereof” may be A only, B only, C only, A and B, A and C, B and C, or A and B and C, where any such combinations may contain one or more member or members of A, B, or C. Sets should be interpreted as a set of elements where the elements number one or more. Accordingly, for a set of X. X would include one or more elements. If a first apparatus receives data from or transmits data to a second apparatus, the data may be received/transmitted directly between the first and second apparatuses, or indirectly between the first and second apparatuses through a set of apparatuses. A device configured to “output” data, such as a transmission, signal, or message, may transmit the data, for example with a transceiver, or may send the data to a device that transmits the data. A device configured to “obtain” data, such as a transmission, signal, or message, may receive, for example with a transceiver, or may obtain the data from a device that receives the data. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words “module,” “mechanism,” “element,” “device,” and the like may not be a substitute for the word “means.” As such, no claim element is to be construed as a means plus function unless the element is expressly recited using the phrase “means for.”

As used herein, the phrase “based on” shall not be construed as a reference to a closed set of information, one or more conditions, one or more factors, or the like. In other words, the phrase “based on A” (where “A” may be information, a condition, a factor, or the like) shall be construed as “based at least on A” unless specifically recited differently.

The following aspects are illustrative only and may be combined with other aspects or teachings described herein, without limitation.

Aspect 1 is a method of wireless communication at a network entity, including: receiving an indication to perform UE-based positioning for a UE; configuring, for the UE, assistance data that includes a list of virtual anchors and a list of VPRUs for the UE-based positioning; and transmitting, to the UE, the assistance data including the list of virtual anchors and the list of VPRUs.

Aspect 2 is the method of aspect 1, further including: generating the list of virtual anchors based on a location offset to each physical anchor in a set of physical anchors.

Aspect 3 is the method of aspect 1 or 2, further including: generating the list of VPRUs based on at least one physical positioning reference unit (PPRU), where each VPRU in the list of VPRUs is associated with a corresponding virtual location in a set of virtual locations.

Aspect 4 is the method of aspect 3, further including: selecting the list of VPRUs for the UE-based positioning based on the corresponding virtual location of each VPRU and an estimated location of the UE.

Aspect 5 is the method of aspect 4, where a ratio between a first approximate distance from the estimated location of the UE to the list of virtual anchors and a second approximate distance from the estimated location of the UE to the list of VPRUs exceeds a ratio threshold.

Aspect 6 is the method of aspect 3, where the corresponding virtual location for each VPRU in the list of VPRUs is pre-assigned or pre-configured.

Aspect 7 is the method of aspect 6, where the virtual location for each VPRU corresponds to a cross point of a grid covering a specific area.

Aspect 8 is the method of aspect 3, further including: receiving, from the UE, a request for using a suitable VPRU; and configuring the assistance data to include the suitable VPRU in the list of VPRUs based on the request.

Aspect 9 is the method of aspect 3, where the corresponding virtual location for each VPRU in the list of VPRUs is generated based on an estimated location of the UE.

Aspect 10 is the method of aspect 9, further including: determining the estimated location of the UE based on at least one of: a serving cell ID associated with the UE, a serving beam ID associated with the UE, an ECID associated with the UE, a previous location estimate of the UE, a location reported by the UE, an SL zone ID associated with the UE, or a RAN-independent location estimate of the UE.

Aspect 11 is the method of any of aspects 1 to 10, further including: generating a set of measurements or correction data for the list of VPRUs based on a virtual location for each VPRU in the list of VPRUs and the list of virtual anchors; and transmitting, to the UE, the set of measurements or the correction data for the UE-based positioning.

Aspect 12 is the method of aspect 11, where the set of measurements or the correction data is further generated based on one or more error sources including at least one of: an anchor clock bias, a group delay, an atmospheric effect or delay, an NLOS effect, or at least one environmental effect.

Aspect 13 is the method of aspect 12, further including: estimating or tracking the one or more error sources based on raw measurements received from a set of physical PRUs.

Aspect 14 is the method of aspect 12, further including: broadcasting the one or more error sources based on an OSR format or an SSR format.

Aspect 15 is the method of any of aspects 1 to 14, where the network entity is a location server or an LMF, and where the indication is received from the UE or a base station serving the UE.

Aspect 16 is the method of any of aspects 1 to 15, where the UE-based positioning is associated with at least one difference-based positioning method.

Aspect 17 is an apparatus for wireless communication at a network entity, including: a memory; and at least one processor coupled to the memory and, based at least in part on information stored in the memory, the at least one processor is configured to implement any of aspects 1 to 16.

Aspect 18 is the apparatus of aspect 17, further including at least one of a transceiver or an antenna coupled to the at least one processor.

Aspect 19 is an apparatus for wireless communication including means for implementing any of aspects 1 to 16.

Aspect 20 is a computer-readable medium (e.g., a non-transitory computer-readable medium) storing computer executable code, where the code when executed by a processor causes the processor to implement any of aspects 1 to 16.

Aspect 21 is a method of wireless communication at a UE, including: transmitting, to a network entity, an indication to perform UE-based positioning; receiving, from the network entity, assistance data that includes a list of virtual anchors and a list of VPRUs for the UE-based positioning; and performing the UE-based positioning using at least one virtual anchor and at least one VPRU in the assistance data.

Aspect 22 is the method of aspect 21, where each virtual anchor in the list of virtual anchors corresponds to a physical anchor with a location offset.

Aspect 23 is the method of aspect 21 or 22, where each VPRU in the list of VPRUs is generated based on at least one physical positioning reference unit, where each VPRU in the list of VPRUs is associated with a corresponding virtual location in a set of virtual locations.

Aspect 24 is the method of any of aspects 21 to 23, further including: transmitting, to the network entity, a request for using a suitable VPRU; and receiving the assistance data that includes the suitable VPRUs in the list of VPRUs based on the request.

Aspect 25 is the method of any of aspects 21 to 24, further including: receiving, from the network entity, a set of measurements or correction data for the list of VPRUs based on a virtual location for each VPRU in the list of VPRUs and the list of virtual anchors.

Aspect 26 is the method of aspect 25, further including: performing the UE-based positioning further based on the set of measurements or correction data.

Aspect 27 is the method of any of aspects 21 to 26, where the UE-based positioning is associated with at least one difference-based positioning method.

Aspect 28 is an apparatus for wireless communication at a UE, including: a memory; and at least one processor coupled to the memory and, based at least in part on information stored in the memory, the at least one processor is configured to implement any of aspects 21 to 27.

Aspect 29 is the apparatus of aspect 28, further including at least one of a transceiver or an antenna coupled to the at least one processor.

Aspect 30 is an apparatus for wireless communication including means for implementing any of aspects 21 to 27.

Aspect 31 is a computer-readable medium (e.g., a non-transitory computer-readable medium) storing computer executable code, where the code when executed by a processor causes the processor to implement any of aspects 21 to 27.

What is claimed is:

1. An apparatus for wireless communication at a network entity, comprising:

a transceiver;

at least one memory; and at least one processor coupled to the transceiver and the at least one memory, and the at least one processor is configured to:

receive, via the transceiver, an indication to perform user equipment (UE)-based positioning for a UE;

configure, for the UE, assistance data that includes a list of virtual anchors and a list of virtual positioning reference units (VPRUs) for the UE-based positioning;

transmit, via the transceiver, the assistance data including the list of virtual anchors and the list of VPRUs;

estimate or track one or more error sources based on a set of raw measurements received from a set of physical PRUs, wherein the one or more error sources include at least one of: an anchor clock bias, a group delay, an atmospheric effect or delay, a non-line-of-sight (NLOS) effect, or at least one environmental effect;

generate a set of measurements or correction data for the list of VPRUs based on (1) a virtual location for each VPRU in the list of VPRUs and the list of virtual anchors and (2) the one or more error sources; and transmit the set of measurements or the correction data for the UE-based positioning.

2. The apparatus of claim 1, wherein the at least one processor is further configured to:

generate the list of virtual anchors based on a location offset to each physical anchor in a set of physical anchors.

3. The apparatus of claim 1, wherein the at least one processor is further configured to:

generate the list of VPRUs based on at least one physical positioning reference unit (PPRU), wherein each VPRU in the list of VPRUs is associated with a corresponding virtual location in a set of virtual locations.

4. The apparatus of claim 3, wherein the at least one processor is further configured to:

select the list of VPRUs for the UE-based positioning based on the corresponding virtual location of each VPRU and an estimated location of the UE.

5. The apparatus of claim 4, wherein a ratio between a first approximate distance from the estimated location of the UE to the list of virtual anchors and a second approximate distance from the estimated location of the UE to the list of VPRUs exceeds a ratio threshold.

6. The apparatus of claim 3, wherein the corresponding virtual location for each VPRU in the list of VPRUs is pre-assigned or pre-configured.

7. The apparatus of claim 6, wherein the virtual location for each VPRU corresponds to a cross point of a grid covering a specific area.

8. The apparatus of claim 3, wherein the at least one processor is further configured to:

receive a request for using a suitable VPRU; and configure the assistance data to include the suitable VPRU in the list of VPRUs based on the request.

9. The apparatus of claim 3, wherein the corresponding virtual location for each VPRU in the list of VPRUs is generated based on an estimated location of the UE.

10. The apparatus of claim 9, wherein the at least one processor is further configured to:

determine the estimated location of the UE based on at least one of:

a serving cell identification (ID) associated with the UE, a serving beam ID associated with the UE, an enhanced cell ID (ECID) associated with the UE, a previous location estimate of the UE, a location reported by the UE, a sidelink (SL) zone ID associated with the UE, or a radio access network (RAN)-independent location estimate of the UE.

11. The apparatus of claim 1, wherein the at least one processor is further configured to:

broadcast the one or more error sources based on an observation space representation (OSR) format or a state space representation (SSR) format.

12. A method of wireless communication at a network entity, comprising:

receiving an indication to perform user equipment (UE)-based positioning for a UE;

configuring, for the UE, assistance data that includes a list of virtual anchors and a list of virtual positioning reference units (VPRUs) for the UE-based positioning;

transmitting the assistance data including the list of virtual anchors and the list of VPRUs;

estimating or tracking one or more error sources based on a set of raw measurements received from a set of physical PRUs, wherein the one or more error sources include at least one of: an anchor clock bias, a group delay, an atmospheric effect or delay, a non-line-of-sight (NLOS) effect, or at least one environmental effect;

generating a set of measurements or correction data for the list of VPRUs based on (1) a virtual location for each VPRU in the list of VPRUs and the list of virtual anchors and (2) the one or more error sources; and transmitting the set of measurements or the correction data for the UE-based positioning.

13. The method of claim 12, further comprising:

generating the list of virtual anchors based on a location offset to each physical anchor in a set of physical anchors.

14. The method of claim 12, further comprising:

generating the list of VPRUs based on at least one physical positioning reference unit (PPRU), wherein each VPRU in the list of VPRUs is associated with a corresponding virtual location in a set of virtual locations.

15. The method of claim 14, further comprising:

selecting the list of VPRUs for the UE-based positioning based on the corresponding virtual location of each VPRU and an estimated location of the UE.

16. The method of claim 14, further comprising:

receiving a request for using a suitable VPRU; and configuring the assistance data to include the suitable VPRU in the list of VPRUs based on the request.

17. An apparatus for wireless communication at a user equipment (UE), comprising:

a transceiver;

at least one memory; and at least one processor coupled to the transceiver and the at least one memory, and the at least one processor is configured to:

transmit, via the transceiver, to a network entity, an indication to perform UE-based positioning;

receive, from the network entity and via the transceiver, assistance data that includes a list of virtual anchors and a list of virtual positioning reference units (VPRUs) for the UE-based positioning;

receive, from the network entity and via the transceiver, a set of measurements or correction data for the list of VPRUs based on a virtual location for each VPRU in the list of VPRUs and the list of virtual anchors, wherein the set of measurements or the correction data is generated based on estimation or tracking of one or more error sources associated with a set of raw measurements from a set of physical PRUs, wherein the one or more error sources include at least one of: an anchor clock bias, a group delay, an atmospheric effect or delay, a non-line-of-sight (NLOS) effect, or at least one environmental effect; and perform the UE-based positioning using at least one virtual anchor and at least one VPRU in the assistance data and based on the set of measurements or the correction data.

18. The apparatus of claim 17, wherein each virtual anchor in the list of virtual anchors corresponds to a physical anchor with a location offset.

19. The apparatus of claim 17, wherein each VPRU in the list of VPRUs is generated based on at least one physical positioning reference unit (PPRU), wherein each VPRU in the list of VPRUs is associated with a corresponding virtual location in a set of virtual locations.

20. The apparatus of claim 17, wherein the at least one processor is further configured to:

transmit, to the network entity, a request for using a suitable VPRU; and receive the assistance data that includes the suitable VPRUs in the list of VPRUs based on the request.

21. A method of wireless communication at a user equipment (UE), comprising:

transmitting, to a network entity, an indication to perform UE-based positioning;

receiving, from the network entity, assistance data that includes a list of virtual anchors and a list of virtual positioning reference units (VPRUs) for the UE-based positioning;

receiving, from the network entity and via the transceiver, a set of measurements or correction data for the list of VPRUs based on a virtual location for each VPRU in the list of VPRUs and the list of virtual anchors, wherein the set of measurements or the correction data is generated based on estimation or tracking of one or more error sources associated with a set of raw measurements from a set of physical PRUs, wherein the one or more error sources include at least one of: an anchor clock bias, a group delay, an atmospheric effect or delay, a non-line-of-sight (NLOS) effect, or at least one environmental effect; and performing the UE-based positioning using at least one virtual anchor and at least one VPRU in the assistance data and based on the set of measurements or the correction data.

22. The method of claim 21, wherein each virtual anchor in the list of virtual anchors corresponds to a physical anchor with a location offset.

23. The method of claim 21, wherein each VPRU in the list of VPRUs is generated based on at least one physical positioning reference unit (PPRU), wherein each VPRU in the list of VPRUs is associated with a corresponding virtual location in a set of virtual locations.

24. The method of claim 21, further comprising:

transmitting, to the network entity, a request for using a suitable VPRU; and receiving the assistance data that includes the suitable VPRUs in the list of VPRUs based on the request.

* * * * *